United States Patent
Fujii

(10) Patent No.: US 12,548,919 B2
(45) Date of Patent: Feb. 10, 2026

(54) FEED DEVICE AND FEED METHOD

(71) Applicant: MINEBEA MITSUMI Inc., Nagano (JP)

(72) Inventor: Masaaki Fujii, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 222 days.

(21) Appl. No.: 18/559,923

(22) PCT Filed: Mar. 30, 2022

(86) PCT No.: PCT/JP2022/016025
§ 371 (c)(1),
(2) Date: Nov. 9, 2023

(87) PCT Pub. No.: WO2022/244517
PCT Pub. Date: Nov. 24, 2022

(65) Prior Publication Data
US 2024/0250451 A1    Jul. 25, 2024

(30) Foreign Application Priority Data

May 19, 2021    (JP) ................................ 2021-084702

(51) Int. Cl.
*H02J 50/23*    (2016.01)
*H01Q 21/22*    (2006.01)
(Continued)

(52) U.S. Cl.
CPC ............. *H01Q 21/22* (2013.01); *H01Q 23/00* (2013.01); *H02J 50/23* (2016.02); *H02J 50/27* (2016.02);
(Continued)

(58) Field of Classification Search
CPC ......... H01Q 21/22; H01Q 23/00; H02J 50/23; H02J 50/27; H02J 50/402; H02J 50/80; H02J 50/90; H02J 50/12; H02J 50/40
See application file for complete search history.

(56) References Cited

U.S. PATENT DOCUMENTS 8,159,364 B2 * 4/2012 Zeine ..................... H02J 50/23
340/5.1
9,876,536 B1 * 1/2018 Bell ......................... H02J 50/00
(Continued)

FOREIGN PATENT DOCUMENTS

| JP | 2017-212849 | 11/2017 |
|----|-------------|---------|
| JP | 2019-083648 | 5/2019 |
| JP | 2021-034910 | 3/2021 |

OTHER PUBLICATIONS

International Search Report for PCT/JP2022/016025 mailed on May 17, 2022.

*Primary Examiner* — Daniel Kessie
*Assistant Examiner* — Brian K Baxter
(74) *Attorney, Agent, or Firm* — IPUSA, PLLC

(57) ABSTRACT

A feed device repeats a frame including multiple subframes to control phases of power transmission signals from multiple first antennas located around each of multiple first power receivers, such that the phases sequentially change while maintaining a phase relation between the power transmission signals, so as to match the phases of the power transmission signals that one of the multiple first power receivers receives from the multiple first antennas. The feed device sequentially changes the phases of power transmission signals that are transmitted from one or more second antennas.

21 Claims, 17 Drawing Sheets

(51) Int. Cl.
*H01Q 23/00* (2006.01)
*H02J 50/27* (2016.01)
*H02J 50/40* (2016.01)
*H02J 50/80* (2016.01)
*H02J 50/90* (2016.01)

(52) U.S. Cl.
CPC ............ *H02J 50/402* (2020.01); *H02J 50/80* (2016.02); *H02J 50/90* (2016.02)

(56) References Cited

U.S. PATENT DOCUMENTS

| | | | |
|---|---|---|---|
| 2019/0168013 A1* | 6/2019 | Arendash | A61N 1/40 |
| 2019/0245389 A1* | 8/2019 | Johnston | H04B 17/21 |
| 2020/0144865 A1* | 5/2020 | Vilenskiy | H02J 50/23 |

* cited by examiner

FIG.8

| ANTENNA GRID INDEX | TIME-SLOT INDEX | | | | | | | |
|---|---|---|---|---|---|---|---|---|
| | 1 | 2 | 3 | 4 | 5 | 6 | 7 | ... |
| ... | ... | ... | ... | ... | ... | ... | ... | ... |
| (4, 4) | 29 | 59 | 19 | 29 | 5 | 34 | 54 | ... |
| (4, 5) | 11 | 41 | 1 | 11 | 51 | 16 | 36 | ... |
| ... | ... | ... | ... | ... | ... | ... | ... | ... |
| (5, 4) | 3 | 33 | 57 | 3 | 43 | 8 | 28 | ... |
| (5, 5) | 24 | 54 | 14 | 24 | 64 | 29 | 49 | ... |
| ... | ... | ... | ... | ... | ... | ... | ... | ... |

FIG.13

| ID | 1 | 2 | 3 | 4 | 5 | 6 | SCORE | ALLOCATION ORDER |
|---|---|---|---|---|---|---|---|---|
| 1 |   | 0 | 0 | 0 | 1 | 1 | 2 | 4 |
| 2 | 0 |   | 1 | 0 | 0 | 0 | 1 | 5 |
| 3 | 0 | 1 |   | 0 | 1 | 1 | 3 | 3 |
| 4 | 0 | 0 | 0 |   | 0 | 0 | 0 | 6 |
| 5 | 1 | 0 | 1 | 0 |   | 4 | 6 | 1 |
| 6 | 1 | 0 | 1 | 0 | 4 |   | 6 | 2 |

FIG.14

| SUBFRAME INDEX | ID (ANTENNA GRID INDEX) | | |
|---|---|---|---|
| 1 | 5 (35, 43, 36, 44) | | |
| | | | |
| | | | |
| | | | |

FIG.15

| SUBFRAME INDEX | ID (ANTENNA GRID INDEX) | | |
|---|---|---|---|
| 1 | 5 (35, 43, 36, 44) | | |
| 2 | 6 (36, 35, 44, 43) | | |
| 3 | 3 (53, 45, 52, 44) | | |
| | | | |

FIG.16

| SUBFRAME INDEX | ID (ANTENNA GRID INDEX) | | |
|---|---|---|---|
| 1 | 5 (35, 43, 36, 44) | | |
| 2 | 6 (36, 35, 44, 43) | | |
| 3 | 3 (53, 45, 52, 44) | 1 (34, 26, 35, 33) | |
| | | | |

FIG.17

| SUBFRAME INDEX | ID (ANTENNA GRID INDEX) | | |
|---|---|---|---|
| 1 | 5 (35, 43, 36, 44) | 2 (45, 37, 46, 38) | |
| 2 | 6 (36, 35, 44, 43) | | |
| 3 | 3 (53, 45, 52, 44) | 1 (34, 26, 35, 33) | |
| | | | |

FIG.18

| SUBFRAME INDEX | ID (ANTENNA GRID INDEX) | | |
|---|---|---|---|
| 1 | 5<br>(35, 43, 36, 44) | 2<br>(45, 37, 46, 38) | |
| 2 | 6<br>(36, 35, 44, 43) | 4<br>(42, 50, 41, 49) | |
| 3 | 3<br>(53, 45, 52, 44) | 1<br>(34, 26, 35, 33) | |
| | | | |

| SUBFRAME INDEX | ID (ANTENNA GRID INDEX) ANTENNA GRID INDEXES FOR ALL ANTENNA ELEMENTS (RANDOM BEAMFORMING) | ANTENNA GRID INDEXES FOR THE OTHER ANTENNA ELEMENTS (RANDOM BEAMFORMING) | ANTENNA GRID INDEXES FOR THE OTHER ANTENNA ELEMENTS (RANDOM BEAMFORMING) | ANTENNA GRID INDEXES FOR THE OTHER ANTENNA ELEMENTS (RANDOM BEAMFORMING) |
|---|---|---|---|---|
| 0 | | | | |
| 1 | | 2 (45, 37, 46, 38) | 4 (42, 50, 41, 49) | 1 (34, 26, 35, 33) |
| 2 | | 5 (35, 43, 36, 44) | 6 (36, 35, 44, 43) | 3 (53, 45, 52, 44) |
| 3 | | | | |

FEED DEVICE AND FEED METHOD

TECHNICAL FIELD

The present invention relates to a feed device and a feed method.

BACKGROUND

A power receiver has been known as including a first detector to detect a direction of the power receiver and including a controller to control a radiating section that radiates fed power such that first radiation and second radiation are performed, and in the first radiation, the fed power is wirelessly radiated in the direction of the power receiver detected by the first detector, and in the second radiation, the fed power is wirelessly radiated while changing, within a preset range, the direction in which the fed power is radiated (See Patent Document 1, for example).

CITATION LIST

Patent Document

[Patent Document 1] Japanese Unexamined Patent Application Publication No. 2019-083648

SUMMARY

Problem to be Solved by the Invention

When powering multiple power receivers, conventional feed devices do not both power a specific power receiver that requires a large amount of received power and power a power receiver other than the specific power receiver.

Therefore, it is an object of the present invention to provide a feed device and a feed method that are capable of both powering a specific power receiver that requires a large amount of received power and powering a power receiver other than the specific power receiver.

Means to Solve the Problem

A feed device according to an embodiment of the present invention includes a power-transmitting control unit configured to control phases of power transmission signals from multiple first antennas, which are located around each of multiple first power receivers, among multiple antennas from which power is configured to be transmitted. The power-transmitting control unit configured to control phases of power transmission signals from one or more second antennas, other than the multiple first antennas located around each of the multiple first power receivers, among the multiple antennas. The multiple first antennas located around one first power receiver among the multiple first power receivers, and multiple first antennas located around the other first power receiver among the multiple first power receivers share at least one first antenna. The power-transmitting control unit is configured to repeat a frame including multiple subframes to control the phases of the power transmission signals from the multiple first antennas located around each of the multiple first power receivers, such that, for one subframe of the multiple subframes, the phases sequentially change while maintaining a phase relation between the power transmission signals, so as to match the phases of the power transmission signals that the one first power receiver, among the multiple first power receivers, receives from the multiple first antennas, which are located around the one first power receiver among the multiple first power receivers, and such that for the other subframe of the multiple subframes, the phases sequentially change while maintaining a phase relation between power transmission signals, so as to match the phases of the power transmission signals that the other first power receiver, among the multiple first power receivers, receives from the multiple first antennas located around the other first power receiver among the multiple first power receivers. The power-transmitting control unit is configured to sequentially change the phases of the power transmission signals that are transmitted from the one or more second antennas.

Effects of the Invention

A feed device and a feed method that are capable of both powering a specific power receiver that requires a large amount of received power and powering a power receiver other than the specific power receiver can be provided.

BRIEF DESCRIPTION OF DRAWINGS

FIG. 8 is a diagram illustrating an example of phase indexes that are set to the antenna elements 111 in the antenna subset 110A in a subset mode.

FIG. 13 is a diagram illustrating assignment order data.

FIG. 14 is a diagram illustrating IDs of specific devices SD1 to SD6 that are assigned to subframes.

FIG. 15 is a diagram illustrating the IDs of the specific devices SD1 to SD6 that are assigned to the subframes.

FIG. 16 is a diagram illustrating the IDs of the specific devices SD1 to SD6 that are assigned to the subframes.

FIG. 17 is a diagram illustrating the IDs of the specific devices SD1 to SD6 that are assigned to the subframes.

FIG. 18 is a diagram illustrating the IDs of the specific devices SD1 to SD6 that are assigned to the subframes.

FIG. 20 is a diagram illustrating a simulation result in a case where specific devices 250A are assigned to subframes.

FIG. 21 is a diagram illustrating an example of drive data.

DESCRIPTION OF EMBODIMENTS

One or more embodiments to which a feed device and a feed method in the present invention are applied are described below.

EMBODIMENTS

Figure 1:
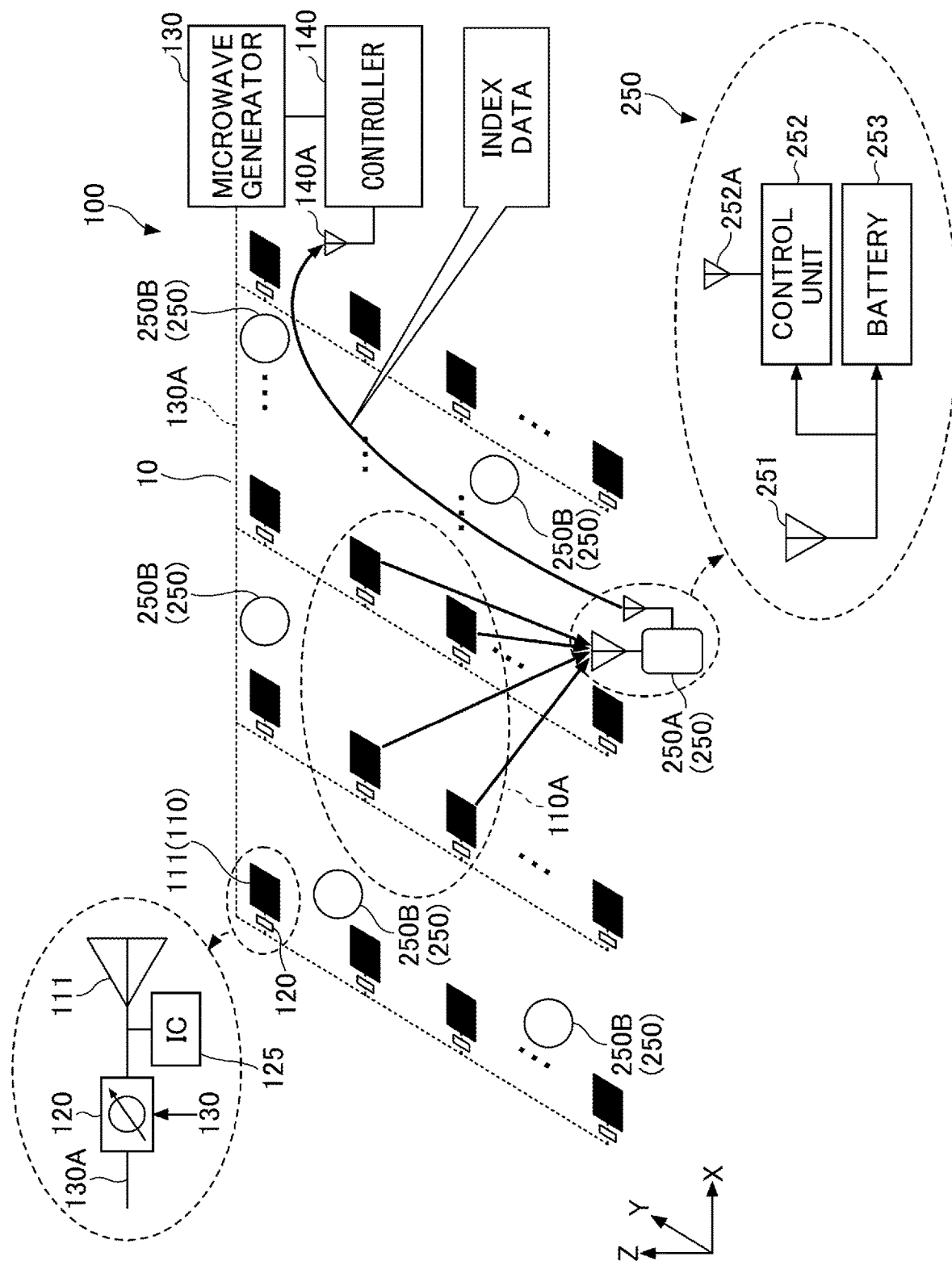
FIG. 1 is a diagram illustrating a feed device 100 according to an embodiment.

FIG. 1 is a diagram illustrating a feed device 100 according to the embodiment. In the following description, an XYZ coordinate system is used. A plan view refers to a view viewed in an X-Y plane.

In an example, the feed device 100 is disposed in a region 10 of a large-scale facility such as a smart factory, a large-scale plant, a logistics center, or a warehouse. The feed device 100 includes an array antenna 110, phase shifters 120, IC chips 125, a microwave generator 130, and a controller 140. The feed device 100 contactlessly powers (microwave power feeding) multiple devices 250 in the region 10. A feed method according to the embodiment is a feed method executed by the feed device 100, and is particularly implemented by a process that the controller 140 performs.

When powering many and unspecified devices 250, the feed device 100 causes the power to be transmitted with beamforming by the array antenna 110. Multiple antenna elements 111 of the array antenna 110 enable transmission in a power transmission phase that is designated by the power-transmitting control unit described below. When phases of power transmission signals that are output from the antenna elements 111 are fixed, one or more standing waves are generated in the region 10 by beams that are formed from multiple antenna output signals, and thus almost no power is supplied to one or more devices 250 that are present at node positions of the standing waves. In order to avoid such a situation, the feed device 100 randomly sequentially shifts the phases of the power transmission signals that are output from the antenna elements 111, so that a node of each standing wave does not occur at a specific location for a long time. In other words, the node of the standing wave moves within the region 10. The phase of the power transmission signal shifts in accordance with a time-slot. The power transmission signal refers to a signal that is supplied (transmitted) from each antenna element 111, and is a signal having predetermined power.

With this arrangement, the power is transmitted with a beam that is formed by randomly shifting the phases of the power transmission signals output from the antenna elements 111 in accordance with time-slots, and such power transmission is hereinafter referred to as random beamforming.

Among the devices 250, one or more devices 250 may require an increased amount of received power to charge an internal battery 253. For example, there is a device 250 that includes an internal battery 253 having a remaining charge that is low due to the device 250 consuming more power than the other devices 250. Such a device 250 that requires more received power is referred to as a specific device 250A. In FIG. 1, one device 250 at a certain time point is illustrated as the specific device 250A. The specific device 250A is an example of a first power receiver.

The specific device 250A mainly receives the power from multiple antenna elements 111, which are included in an antenna subset 110A, among the multiple antenna elements 111. This is because the battery 253 of the specific device 250A is charged at an early stage in view of the fact that the power is transmitted concentratedly in comparison to the random beamforming. Each antenna element 111 included in the antenna subset 110A is an example of a first antenna. Any antenna element 111 that is not included in the antenna subset 110A is an example of a second antenna.

When the power is transmitted from the multiple antenna elements 111 included in the antenna subset 110A, to the specific device 250A, the phases of the power shift in accordance with a corresponding time-slot. In FIG. 1, the antenna subset 110A includes four antenna elements 111. The antenna subset 110A will be described below, including a phase shift of the power transmission signal that is transmitted to the specific device 250A.

Among the multiple devices 250, one or more devices other than the specific device 250A refers to non-specific devices 250B. Each non-specific device 250B is an example of a second power receiver. All devices 250 may become specific devices 250A depending on a situation. For a given specific device 250, when a charged amount of the battery 253 reaches a sufficient amount, the power is not concentratedly supplied to the given specific device 250A via the antenna subset 110A, and the given specific device 250A becomes a non-specific device 250B. The non-specific device 250B receives power that is transmitted with random beamforming and is from one or more antenna elements 111 included in the antenna subset 110A. Multiple non-specific devices 250B may include a non-specific device 250B that does not become a specific device 250B, where the non-specific device 250B consumes less power than the other non-specific devices 250A and the specific device 250A.

The feed device 100 is a feed device that both transmits the power to one or more non-specific devices 250B by random beamforming and transmits power to one or more specific device 250A via the antenna subset 110A. In the following description, when the specific device 250A and the non-specific device 250B are not particularly distinguished from each other, they are simply referred to as devices 250.

Each device 250 includes a power receiving antenna 251, a control unit 252, and a battery 253, as illustrated in an enlarged manner on a lower part of FIG. 1.

The power receiving antenna 251 is an antenna via which the power from one or more antenna elements 111 is received. The received power is output to the control unit 252 and the battery 253 via the power receiving antenna 251.

Under a condition in which the power from one or more antenna elements 111 is received via the power receiving antenna 251, the control unit 252 controls the charge of the battery 253 with the received power, and the control unit 252 transmits an alarm from the antenna 252A to the controller 140 when a charged amount of the battery 253 becomes a predetermined value or less. The control unit 252 includes, for example, a short-range wireless communication unit, such as BLE (Bluetooth Low Energy (registered trademark) or EnOcean (registered trademark). The control unit 252 writes data indicating an alarm, in a beacon signal of the BLE, and transmits the beacon signal from the antenna 252A to the controller 140. In addition, in response to receiving a time-slot index detection command described below, the control unit 252 receives the power for a predetermined time period, and then transmits, to the controller 140, index data of a time-slot index (time-slot number) indicating the greatest received power. A timing at which the control unit 252 receives a power transmission command from the controller 140 is a timing at which the charged amount of the battery 253 becomes less than or equal to a predetermined value. It is sufficient when the transmitting of the power transmission command from the controller 140 to a given device 250 is performed, for example, by the BLE, as in the time-slot index detection command. The index data is an example of information specifying a time-slot.

The battery 253 includes, for example, a secondary battery or a capacitor, and is charged with the power supplied from one or more power receiving antennas 251. A load to consume the power may be coupled to the battery 253. For example, the load may be a sensor that detects temperature, humidity, or the like. In this case, the device 250 can be used as a sensor device. In addition, the load may be a power source such as a motor or an actuator, and the device 250 may be a device that performs dynamic work.

Further, when the device 250 is attached to a movable mobile object, the power with the battery 253 is charged can be used as power for driving a power source including a motor or the like, a controller, or the like, of the mobile object, where the power source, the controller, or the like is used as a load.

The array antenna 110 is an example of a two dimensional antenna grid, and includes antenna elements 111 that are arranged in a matrix, for example. An example of the antenna elements 111 includes 256 antenna elements in which 16 antenna elements are arranged in an X-direction and 16 antenna elements are arranged in a Y-direction. The 256 antenna elements 111 are located on an X-Y plane.

Each antenna element 111 is coupled to a microwave generator 130 via a transmission cable 130A, and power within a microwave bandwidth is supplied to the antenna element 111. Under the control of the controller 140, the power is transmitted to the specific device 250A via four antenna elements 111, which are selected as antenna elements 111 that construct the antenna subset 110A, among the 256 antenna elements 111. In this case, one or more non-specific devices 250B located in proximity to the specific device 250A are also powered secondarily. By random beamforming, the power is transmitted to the non-specific devices 250B from antenna elements 111 that are not included in the antenna subset 110A, and further, one or more non-specific devices 250B are powered secondarily by one or more antenna elements 111 that are relatively located in proximity to the specific device 250A. As long as the number of antenna elements 111 that are included in the antenna subset 110A is plural, any number may be adopted. The antenna element 111 is a patch antenna having a rectangular shape in a plan view. The antenna element 111 may include a ground plate that is held at a ground potential on a negative Z-direction side.

Each antenna element 111 is attached to a ceiling, a column, or the like of a large-scale facility such as the above smart factory. In an example, a distance between antenna elements 111 corresponds to multiple wavelengths of a communication frequency that is applied to the antenna element 111. The communication frequency for the antenna element 111 is assumed to be, for example, within a microwave bandwidth, and as an example, a frequency within the 920 MHz band is used.

FIG. 1 illustrates a state example in which the specific device 250A receives the power from four antenna elements 111 among the 256 antenna elements 111 that are included in the array antenna 110. In this case, a set of antenna elements 111 that are selected by the controller 140 to transmit the power to the specific device 250A is referred to as the antenna subset 110A. The power is transmitted with random beamforming from antenna elements 111 that are not included in the antenna subset 110A, while shifting the phases of transmission signals in accordance with a corresponding time-slot. Non-specific devices 250B receive the power that is transmitted with the random beamforming, and the specific device 250A also secondarily receives the power transmitted with the random beamforming.

The phase shifter 120 is coupled to each one of the antenna elements 111, and is inserted between the antenna element 111 and the transmission cable 130A. In FIG. 1, for convenience of explanation, one antenna element 111, the phase shifter 120, and the IC chip 125 are illustrated in an enlarged manner.

The phase shifter 120 shifts a transmission phase of the power that is transmitted from the microwave generator 130 via the transmission cable 130A, and then outputs the power to the antenna element 111. The phase shifter 120 is an example of a phase-adjusting unit. The IC chip 125 includes a measurement unit that measures a received signal strength indicator (RSSI) of received power, and includes a BLE communication unit. The IC chip 125 transmits a beacon signal including data indicative of a measured RSSI value, to the controller 140. The communication unit of the IC chip 125 includes an antenna for BLE communications.

The microwave generator 130 is coupled to 256 phase shifters 120, and supplies microwaves having predetermined power. The microwave generator 130 is an example of a radio wave generator. The frequencies of the microwaves are, for example, frequencies in the 920 MHz band. In this description, a manner in which the feed device 100 includes the microwave generator 130 is illustrated, but the microwave is not limiting. It is sufficient when a radio wave of a predetermined frequency is used.

The controller 140 is an example of a controller, and is a microcomputer that includes a central processing unit (CPU), a read only memory (ROM), a random access memory (RAM), a nonvolatile memory, and the like. As an example of the controller, a discrete wavelet multitone (DWMT) can be used.

The controller 140 includes an antenna 140A, receives a beacon signal in which an alarm is written, from the device 250, and receives the beacon signal having an RSSI value, from the IC chip 125 that is coupled to each of the antenna elements 111. The controller 140 also receives index data indicating a time-slot index, from the specific device 250A. The index data is data indicating a time-slot index in a case where the greatest received power at the specific device 250A is obtained, when determining the phase relation between the power transmission signals from the multiple antenna elements 111 included in the antenna subset 110A. The relation (phase relation) between the phases of the power transmission signals from the multiple antenna elements 111 included in the antenna subset 110A is determined by the index data that is received from the specific device 250A. This will be described below in detail.

The controller 140 performs a selection control of one or more antenna elements 111 included in the antenna subset 110A, controls the phases at the 256 phase shifters 120, and controls the output of the power of the microwave generator 130. The phase control for the power transmission signals from the antenna elements 111 included in the antenna subset 110A, and the phase control for power transmission signals with random beamforming that is implemented by antenna elements 111, which are not included in the antenna subset 110A, are enabled by phase control at phase shifters 120.

Figure 2:
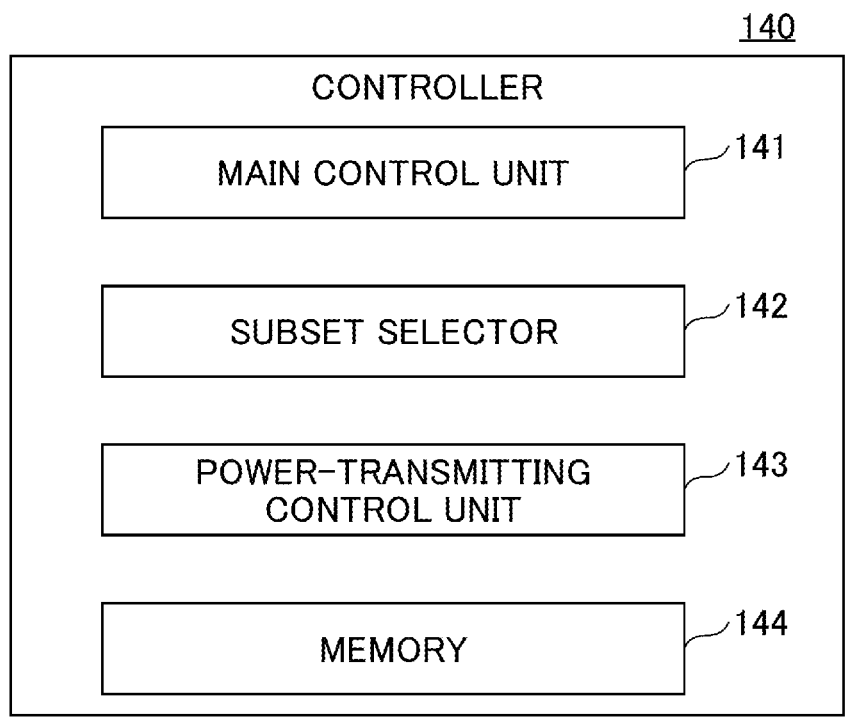
FIG. 2 is a diagram illustrating the configuration of a controller 140.

FIG. 2 is a diagram illustrating the configuration of the controller 140. The controller 140 includes a main control unit 141, a subset selector 142, a power-transmitting control unit 143, and a memory 144. Functions of the main control unit 141, the subset selector 142, and the power-transmitting control unit 143 are implemented by a program that the controller 140 executes, and are illustrated as functional blocks. The memory 144, which is implemented by a memory in the controller 140, is functionally illustrated.

The main control unit 141 is a processing unit that performs a process of the whole controller 140, and performs the process other than a process that is performed by the subset selector 142 and the power-transmitting control unit 143.

When receiving, from any device 250, a beacon signal including an alarm, the subset selector 142 transmits a power transmission command to the device 250. The device 250 that has transmitted the beacon signal including an alarm is a given device 250 whose charged amount is less than or equal to a predetermined value, and is a device 250 that is a candidate for the specific device 250A. The subset selector 142 monitors the received power at all the antenna elements 111, after transmitting the power transmission command. Then, the subset selector 142 also selects multiple antenna elements 111 for which received power strength (RSSI) of each is greater than or equal to a predetermined value, as antenna elements 111 included in the antenna subset 110A. Further, when the antenna elements 111 included in the antenna subset 110A are selected, the device 250 that is a candidate for the specific device 250A is used as the specific device 250A. Given multiple antenna elements 111, for which received signal strength (RSSI) of each is greater than or equal to a predetermined value, are antenna elements 111 that are located around the specific device 250A and are closer to the specific device 250A than to multiple antenna elements 111 for which received signal strength (RSSI) of each is less than the predetermined value. Alternatively, with a rank for the highest magnitudes of the RSSIs, antenna elements 111 of a predetermined top rank may be used.

The power-transmitting control unit 143 performs a power transmission control in which the power is transmitted from all the antenna elements 111. When transmitting the power from all the antenna elements 111, the power-transmitting control unit 143 performs the power transmission control (random mode) in which the phases of the power transmission signals from all the antenna elements 111 are randomly set and the phases are shifted for each time-slot. With this arrangement, the position where each standing wave of the power transmission signal is generated in the region 10 (see FIG. 1) can be prevented from being temporally fixed, and thus all the devices 250 can receive power relatively uniformly.

In addition, when the antenna subset 110A is constructed by the subset selector 142, the power-transmitting control unit 143 executes a received-power monitoring mode that monitors the received power at the specific device 250A, in order to switch the power transmission control of the antenna elements 111 included in the antenna subset 110A, from the random mode to a subset mode. In the received-power monitoring mode, as in the random mode, a process in which phases of given antenna elements 111 are randomly set and then the phases are randomly shifted for each time-slot is performed for a predetermined period. The predetermined period is, for example, a period corresponding to 256 time-slots. When the power-transmitting control unit 143 receives, from the specific device 250A, an index indicating a given time-slot index after a predetermined period has elapsed, the mode shifts to the subset mode, and then a power transmission control is performed to transmit the power while randomly shifting, for each time-slot, a phase set (a set of phases of the power transmission signals from multiple antenna elements 111) of the power transmission signals from multiple antenna elements 111, while maintaining, for each time-slot indicated by the index data, the relation (phase relation) between the phases of the power transmission signals from the multiple antenna elements 111. The phase relation is a relation between phases of the power transmission signals from the multiple antenna elements 111, and is a relation in phase differences between the power transmission signals from the multiple antenna elements 111. Upon receiving a beacon signal indicating the completion of charging, from the specific device 250A, the power-transmitting control unit 143 ends the subset mode, and returns the power transmission mode of the multiple antenna elements 111 included in the antenna subset 110A to the random mode.

When given antenna subsets 110A are constructed by the subset selector 142, the power-transmitting control unit 143 further performs the process described below as illustrated in FIGS. 11 to 21.

The memory 144 stores data, a program, and the like that are to be used when the main control unit 141, the subset selector 142, and the power-transmitting control unit 143 perform the process. Data indicating the phase of the power transmission signal for each time-slot is also stored in the memory 144.

Figure 3:
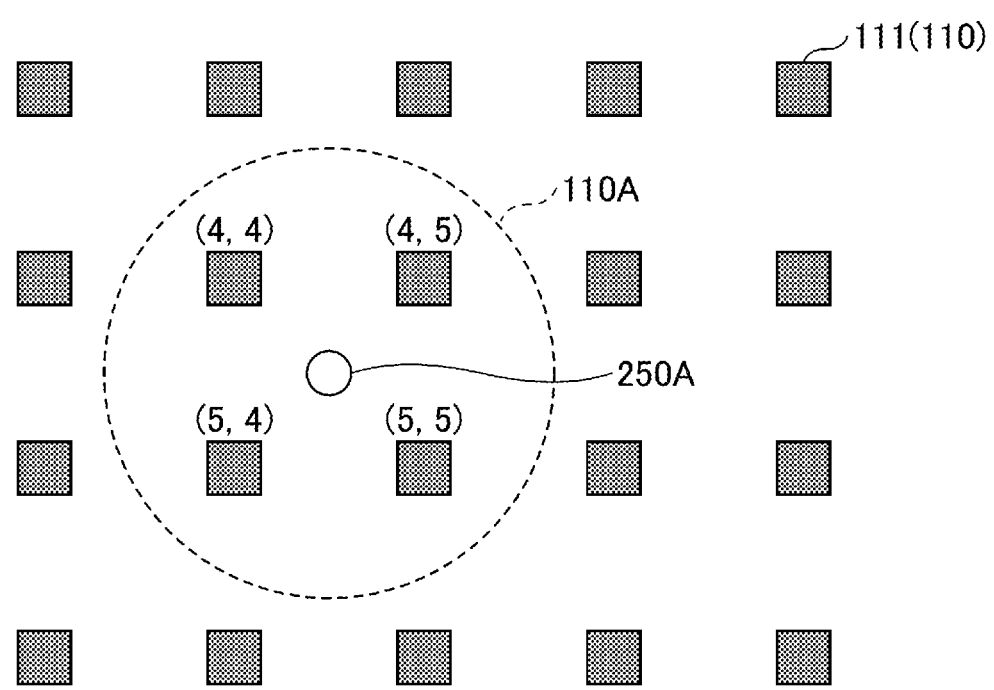
FIG. 3 is a diagram illustrating an example of an antenna subset 110A.

FIG. 3 is a diagram illustrating an example of the antenna subset 110A. FIG. 3 illustrates 20 antenna elements of the 256 antenna elements 111. For example, four antenna elements 111 are included in the antenna subset 110A, and their antenna grid indexes are respectively given as (4,4), (4,5), (5,4), and (5,5). The antenna grid index refers to an index indicating a position of an antenna element 111 in the region 10 (see FIG. 1). The specific device 250A is located approximately near the center of the antenna subset 110A. The four antenna elements 111 whose antenna grid indexes are given as (4, 4), (4, 5), (5, 4), and (5, 5) are antenna elements 111 that are located around the specific device 250A, and that are closer to the specific device 250A than multiple antenna elements 111 whose antenna grid indexes are indexes other than (4, 4), (4, 5), (5, 4), and (5, 5) are to the specific device 250A.

Figure 4:
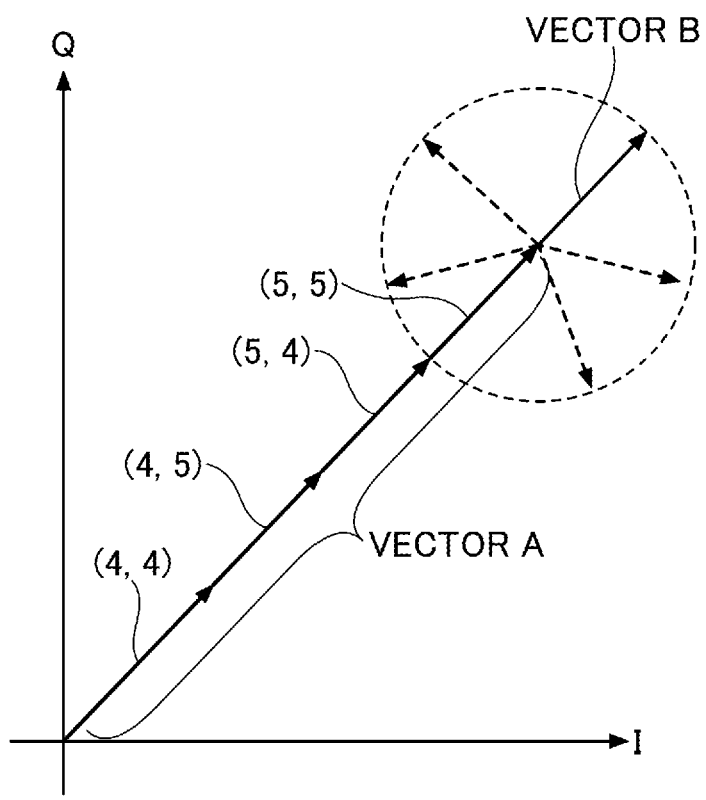
FIG. 4 is a diagram for describing a phase of a power reception signal of a specific device 250A.

FIG. 4 is a diagram illustrating the phase of a received power signal by the specific device 250A. An I-axis expresses a real axis, and a Q-axis expresses an imaginary axis. Four vectors given by (4, 4), (4, 5), (5, 4), and (5, 5) are vectors indicating signals that the specific device 250A receives from the antenna elements 111 whose antenna grid indexes are given by (4, 4), (4, 5), (5, 4), and (5, 5).

If phases of the signals that the specific device 250A receives from the four antenna elements 111 match, a linear vector A is obtained by adding the signals received by the antenna elements 111 whose antenna grid indexes are (4, 4), (4, 5), (5, 4), and (5, 5). The vector A indicates the greatest received power in a case where the phases of the signals that the specific device 250A receives from the antenna elements 111, whose antenna grid indexes are (4, 4), (4, 5), (5, 4), and (5, 5), match.

With this arrangement, if the phases of the signals that the specific device 250A receives from the antenna elements 111, whose antenna grid indexes are (4, 4), (4, 5), (5, 4), and (5, 5), included in the antenna subset 110A are matched, a composite vector of four received signals can be maximized. Here, the matching of the phases is not intended to limit to only a case where the phases are exactly the same, and covers a condition in which the phases are approximately the same as the condition in which the phases are exactly the same. This is because it may not be easy to match phases strictly, and for example, if a phase shift is about +5%, there is no problem in which it is considered that the phases are matched.

While a phase relation between power transmission signals that are transmitted from the antenna elements 111 whose antenna grid indexes are (4, 4), (4, 5), (5, 4), and (5, 5) is maintained, in a case where phases of four transmission signals shift, the vector A rotates with respect to the I-axis and the Q-axis. By shifting the phases of the four power transmission signals while maintaining the phase relation between the four power transmission signals, a condition in which the greatest received power at the specific device 250A is obtained can be set, and thus the specific device 250A can be charged in a shorter time.

In addition, multiple antenna elements 111 that are around the antenna subset 110A and are not included in the antenna subset 110A transmit the power in the random mode, and thus the specific device 250A receives one or more power transmission signals in the random mode. The power received by the specific device 250A in the random mode is smaller than the power received from the multiple antenna elements 111 included in the antenna subset 110A. This is because the specific device 250A is located closer to the antenna elements 111 in the antenna subset 110A than to the antenna elements 111 outside the antenna subset 110A. Here, the power that the specific device 250A receives in the random mode is expressed by a vector B. In the random mode, the phase shifts for each time-slot, the vector B rotates 360 degrees at random, as indicated by the dashed arrow.

That is, when the power is transmitted in the random mode and a subset mode in the region 10 (see FIG. 1), the received power by the specific device 250A becomes received power expressed by a composite vector of the vector A and the vector B as illustrated in FIG. 4, and thus variations in the random mode is included in the received power. A signal that the specific device 250A receives is mainly influenced by the vector A, thereby increasing the received power.

Figure 5:
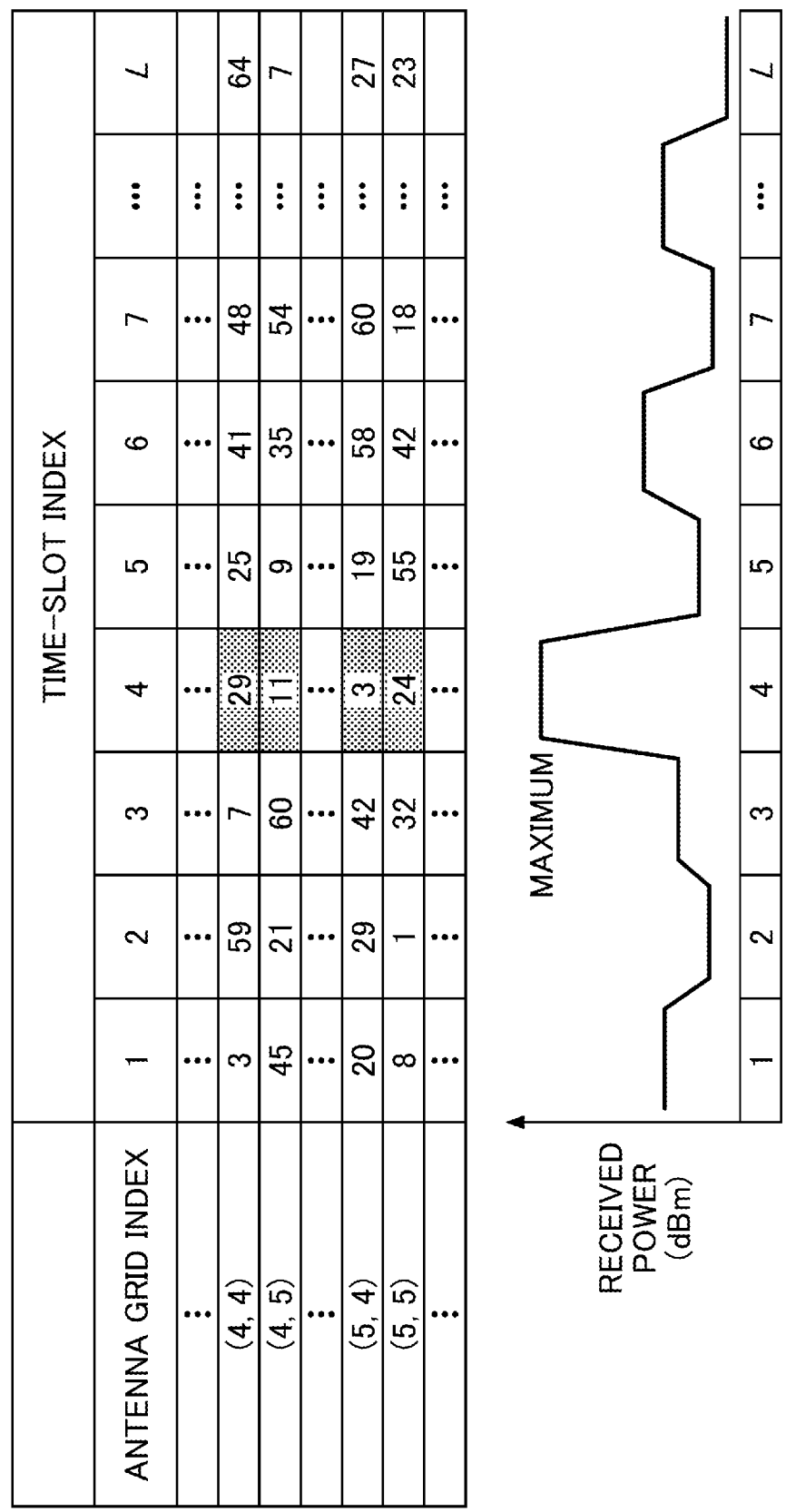
FIG. 5 is a diagram illustrating a method for determining a phase relation in a received-power monitoring mode between power transmission signals from multiple antenna elements 111.

FIG. 5 is a diagram illustrating a method for determining the phase relation between transmission signals from multiple antenna elements 111 in the received-power monitoring mode. In a table on an upper part of FIG. 5, separate time-slots are given in a horizontal direction, and the time-slot indexes are respectively set to 1 to L, for example. The L is, for example, 256. Also, antenna grid indexes are given in a vertical direction of the table, and respectively indicate the phases of the power transmission signals from the antenna elements 111 that are given as (4, 4), (4, 5), (5, 4), and (5, 5). The phases of the four power transmission signals, which are from the respective antenna elements 111, are randomly set for each time-slot, and the phases of the four power transmission signals randomly shift for each time-slot.

A lower part of FIG. 5 illustrates the received power (dBm) at the specific device 250A for the time-slot indexes of 1 to L. The specific device 250A may store, for each time-slot, the received power in a memory in the control unit 252, or may compare the received power to make an update to an time index at which the greatest received power is obtained up to a current time point. In an example in FIG. 5, the greatest received power is obtained when the time-slot index is 4, in a case where the power is received for the time-slot indexes of 1 to L. In this case, the phase indexes of the transmission signals from the antenna elements 111, whose antenna grid indexes are (4, 4), (4, 5), (5, 4), and (5, 5), are 29, 11, 3, and 24, respectively. In this case, the specific device 250A transmits index data indicating that the time-slot index is 4 to the controller 140. The phase index indicates a value that is obtained by standardizing phases. A greater value shows an increased value of a given phase. It is sufficient when the specific device 250A starts counting time-slots at a timing at which a beacon signal is transmitted or for a time period during which the power is not transmitted from any array antennas 110. This is because when such these timings described above are used, the specific device 250A can easily start counting the time-slots. In addition, under a condition in which the specific device 250 and the controller 140 share information of time-slots, it is sufficient when the specific device 250A respectively starts counting the time-slots at each of timings at which, for example, a frame header of a frame including a time-slot index of a corresponding one of 1 to L is detected.

With this arrangement, by use of the index data to notify the controller 140 of the time-slot index that is used when the greatest received power at the specific device 250A is obtained, the specific device 250A can communicate, to the controller 140, a phase relation between the transmission signals that are used when the greatest received power is obtained. Thus, the power can be transmitted to maintain the phase relation that enables efficient reception of the power. It is sufficient when the index data is data capable of specifying one of 256 time-slot indexes, and thus the index data is set to have a data size of only 8 bits.

When maintaining the phase relation in which phases of the power transmission signals from the antenna elements 111, whose antenna grid indexes are (4, 4), (4, 5), (5, 4), and (5, 5), are 29, 11, 3, and 24, respectively, the greatest received power at the specific device 250A is obtained. When such a relation of the phase differences is maintained, the received power at the specific device 250A is set in a state where four vectors of the received power are matched (or a state close to a matched state) as illustrated in FIG. 4. Thus, the power can be efficiently received.

In such a manner, while maintaining the phase relation described above, the feed device 100 randomly shifts, for each time-slot, the phases of the power transmission signals from antenna elements 111, whose antenna grid indexes are (4, 4), (4, 5), (5, 4), and (5, 5), and thus feeds the power from the antenna subset 110A to the specific device 250A.

Figure 6:
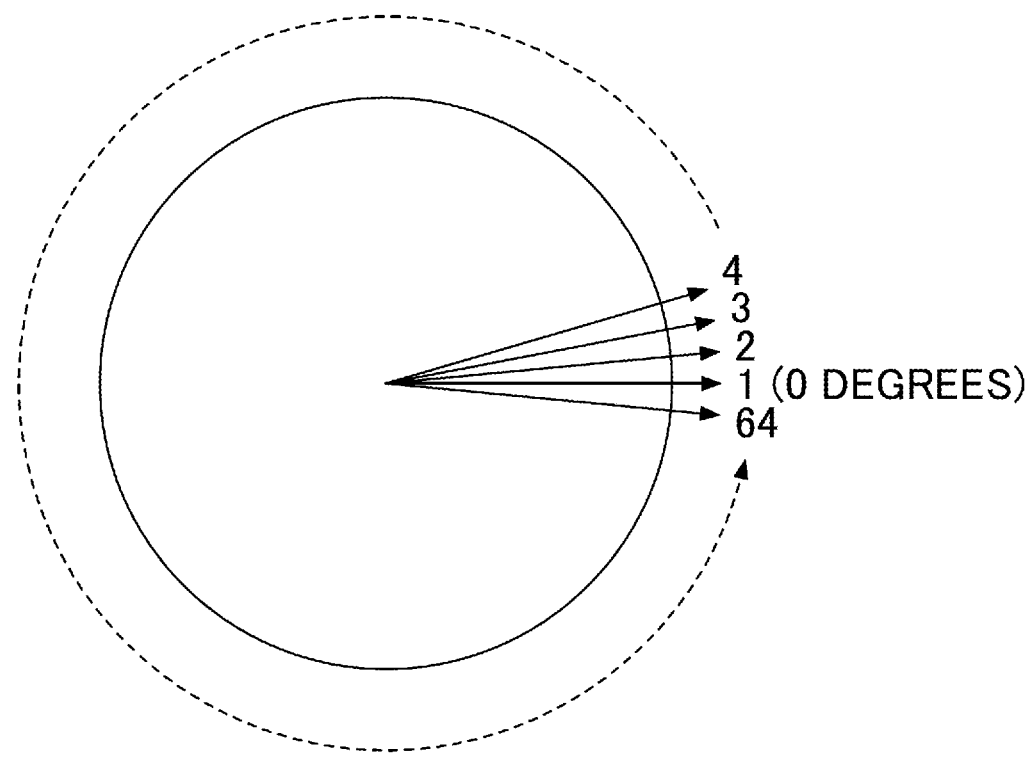
FIG. 6 is a diagram for describing a phase index.

FIG. 6 is a diagram for describing the phase indexes. In an example in FIG. 6, the phase indexes that are defined by dividing 360 degrees by 64 are illustrated. When the phase index is 1, the phase is 0 degrees. Each time the phase index increases, the phase is increased by 360 degrees/64. Such a phase index is obtained by PSK (phase shift keying).

Figure 7:
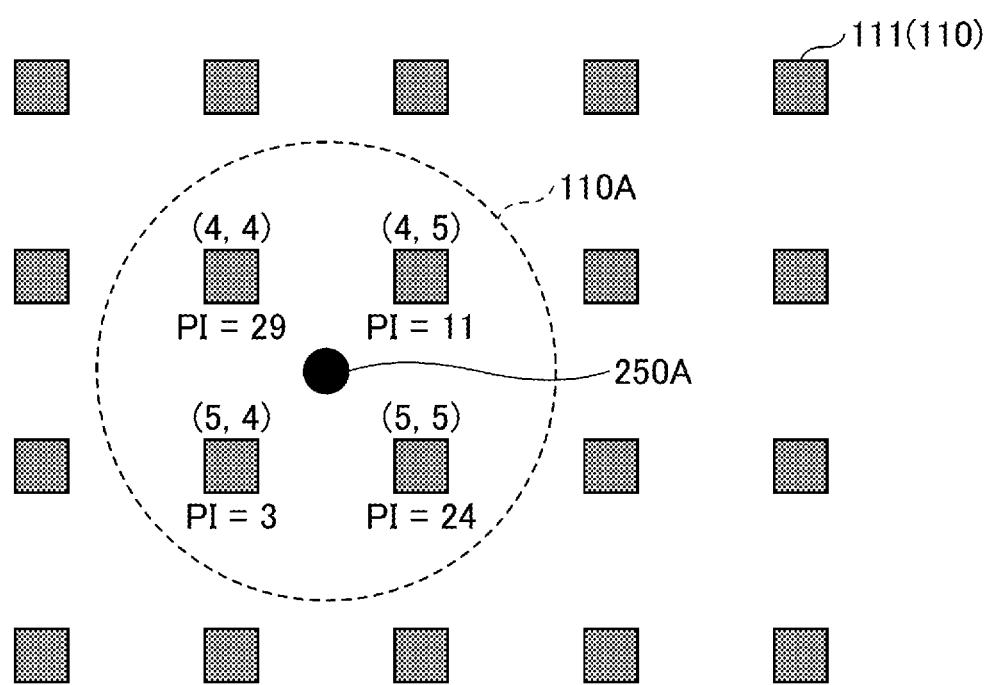
FIG. 7 is a diagram illustrating an example of phase indexes PI that are assigned to respective antenna elements in the antenna subset 110A.

FIG. 7 is a diagram illustrating an example of phase indexes PI that are assigned to the antenna elements 111 in the antenna subset 110A. The power transmission phase indexes PI for the power transmission signals from the antenna elements 111, whose antenna grid indexes are (4, 4), (4, 5), (5, 4), and (5, 5), are respectively set to 29, 11, 3, and 24. The feed device 100 feeds the power from the antenna subset 110A to the specific device 250A, while randomly shifting, for each time-slot, the phases of the power transmission signals, as well as maintaining a corresponding phase relation.

FIG. 8 is a diagram illustrating an example of phase indexes that are set in the subset mode to the antenna elements 111 in the antenna subset 110A. As illustrated in FIG. 8, when the time-slot index is 1, phase indexes PI of the transmission signals from the antenna elements 111, whose antenna grid indexes are (4, 4), (4, 5), (5, 4), and (5, 5), are set to 29, 11, 3, and 24. In addition, after the time-slot index of 2, phase indexes PI of the power transmission signals from the antenna elements 111, whose antenna grid indexes are (4, 4), (4, 5), (5, 4), and (5, 5), randomly shift, while a phase relation that is obtained when the time-slot index is 1 is maintained.

When the time-slot index is 1, phase indexes PI of transmission signals from antenna elements 111 whose antenna grid indexes are (4, 4) and (4, 5) are 29 and 11, respectively, and thus the difference between the phase indexes is 18. When the time-slot index is 1, phase indexes PI of power transmission signals from antenna elements 111, whose antenna grid indexes are (4, 4) and (5, 4), are 29 and 3, respectively, and the thus difference between the phase indexes is 26. When the time-slot index is 1, phase indexes PI of transmission signals of antenna elements 111, whose antenna grid indexes are (4, 4) and (5, 5), are 29 and 24, respectively, and thus the difference between the phase indexes is 5.

After the time slop index of 2, the phase indexes PI of the power transmission signals of the antenna elements 111 whose antenna grid indexes are (4, 4), (4, 5), (5, 4), and (5, 5) randomly shift, while the phase difference described above is maintained. In an example, when the time-slot index transitions from 1 to 2, each of four phase indexes increases by 30. When the time-slot index transitions from 2 to 3, each of the four phase indexes decreases by 40. Here, the phase index is expressed, for example, by any one of numerical values of 1 to 64. For this reason, for a given phase index PI of the power transmission signal from the antenna element 111 whose antenna grid index is (5, 4), when the time-slot index transitions from 2 to 3, 33-40=-7 is given, and thus the given phase index PI is given by 57 that is obtained by adding 64 to -7. The same phase relation as discussed with regard to the four phase indexes is also adopted after the time-slot index transitions from 3 to 4.

Figure 9:
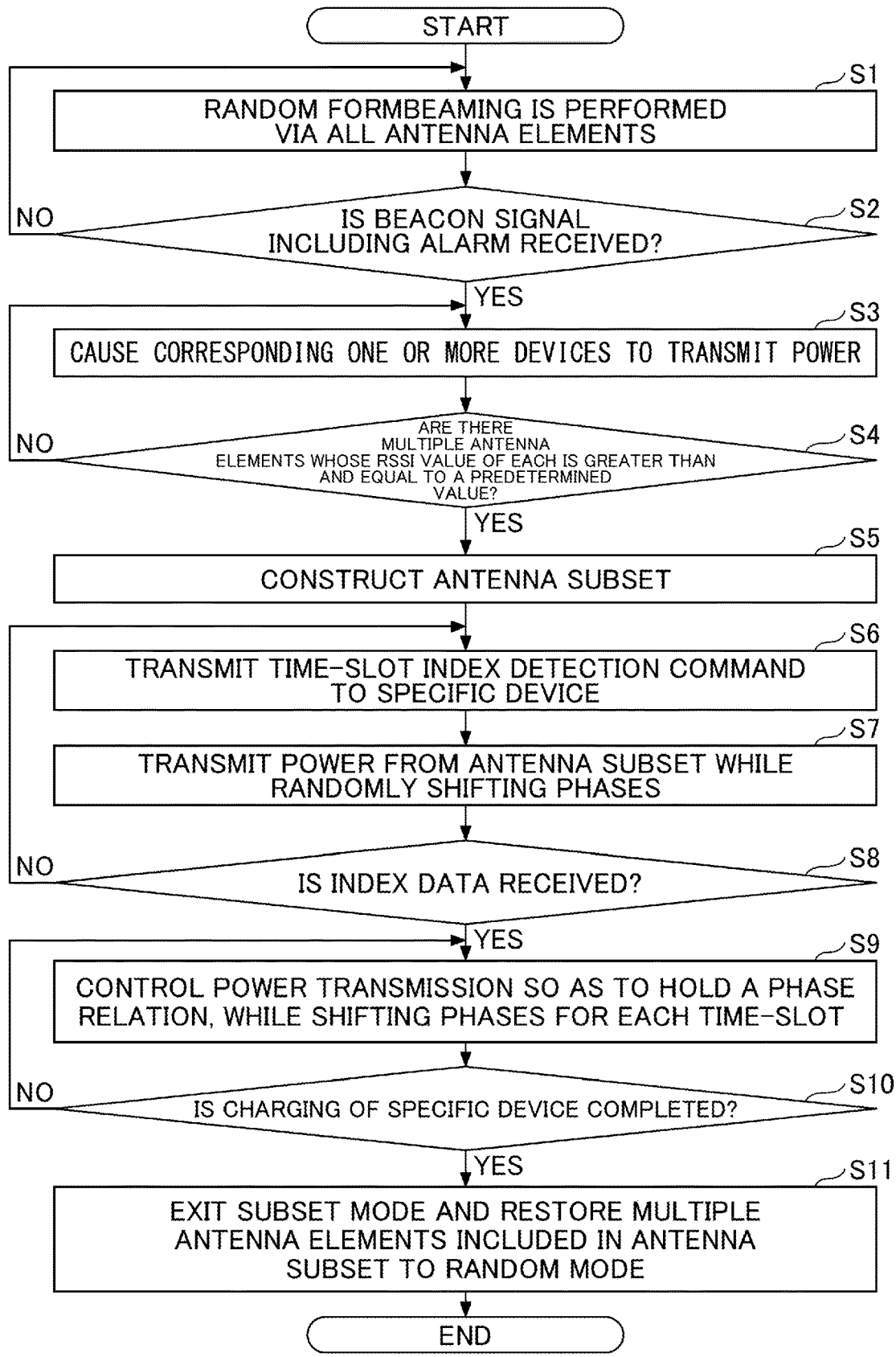
FIG. 9 is a flowchart illustrating a process executed by a controller 140.

FIG. 9 is a flowchart illustrating a process executed by the controller 140. When the process starts, the power-transmitting control unit 143 transmits the power from all the antenna elements 111 in the random mode (step S1). In the random mode, the power-transmitting control unit 143 performs a power transmission control with random beamforming, in which phases of power transmission signals from all the antenna elements 111 are randomly set, and then the phases are randomly shifted for each time-slot.

The subset selector 142 determines whether to receive a beacon signal including an alarm, from any device 250 (step S2). A given device 250 in which a charged amount of the battery 253 becomes less than or equal to a predetermined value writes data indicating the alarm in the beacon signal for the BLE, and transmits the beacon signal to the controller 140. The process in step S2 is a process of determining whether the beacon signal including the above alarm has been received. The beacon signal includes an identifier (ID) of a corresponding device 250, and thus the beacon signal can specify the device 250 that is a transmission source. When receiving the beacon signal including the alarm, the subset selector 142 detects that there is the given device 250 for which the charged amount is less than or equal to the predetermined value.

If the beacon signal including the alarm is determined to be received (S2: YES), the subset selector 142 transmits a power transmission command to one or more corresponding devices 250, and then causes power transmission (step S3).

The subset selector 142 monitors received power at all the antenna elements 111, and determines whether there are multiple antenna elements 111 for each of which an RSSI value of a received signal is greater than or equal to a predetermined value (step S4).

If it is determined that there are multiple antenna elements 111 for each of which an RSSI value of a received signal is greater than or equal to a predetermined value (S4: YES), the subset selector 142 selects multiple antenna elements 111 for each of which the RSSI value is greater than or equal to the predetermined value, and thus constructs the antenna subset 110A with the selected multiple antenna elements 111 (step S5).

If the antenna subset 110A is set by the subset selector 142, the power-transmitting control unit 143 transmits a time-slot index detection command to the specific device 250A (step S6). The time-slot index detection command is a command to randomly set, over a predetermined period, phases of the power transmission signals from the multiple antenna elements 111 in the antenna subset 110A as illustrated in FIG. 5; randomly shift the phases of the power transmission signals, for each time-slot over the predetermined period; and cause the specific device 250A to detect a time-slot index at which the greatest received power is obtained.

The power-transmitting control unit 143 operates in the received-power monitoring mode in which a process of randomly setting phases of power transmission signals of the multiple antenna elements 111 in the antenna subset 110A, then randomly shifting the phases for each time-slot, and thereby transmitting the power is performed over a predetermined period (step S7). With this approach, the power transmission signals having the phase indexes as illustrated in FIG. 5 are transmitted from the multiple antenna elements 111 in the antenna subset 110A.

The power-transmitting control unit 143 determines whether to receive index data indicating a time-slot index from the specific device 250A (step S8). The specific device 250A transmits, as the index data, the time-slot index at which the greatest received power is detected during the predetermined period in step S7, to the power-transmitting control unit 143.

If the index data is determined to be received (S8: YES), the power-transmitting control unit 143 performs a power transmission control in which the power is transmitted, while for each time-slot, the phases of the power transmission signals from the multiple antenna elements 111 in the antenna subset 110A are shifted under a condition in which a phase relation provided by a given time-slot, which is indicating by the index data, is held (step S9). With this approach, the subset mode is operated in which the phases of the power transmission signals from the multiple antenna elements 111 in the antenna subset 110A are shifted for each time-slot, while the phase relation in which the greatest received power is obtained as illustrated in FIG. 8 is maintained. The power-transmitting control unit 143 determines whether charging of the specific device 250A is completed (step S10). In response to receiving a beacon signal including data indicating that the charging of the specific device 250A is completed, the power-transmitting control unit 143 determines that the charging of the specific device 250A is completed.

If it is determined that charging of the specific device 250A is completed (S10: YES), the power-transmitting control unit 143 exits the subset mode, and then restores the power transmission mode for the multiple antenna elements 111 included in the antenna subset 110A, to the random mode (step S11). With this approach, a series of processes is terminated (END).

If it is determined in step S2 that a beacon signal including an alarm is not received (S2: NO), the subset selector 142 returns the flow to step S1, and then continues the random mode. This is because there is no device 250 to be charged by constructing the antenna subset 110A.

In addition, if it is determined in step S4 that there is no antenna element 111 for which an RSSI value of a received signal is greater than or equal to a predetermined value (S4: NO), the subset selector 142 returns the flow to step S3. This is because the subset selector 142 causes the given device 250 to transmit the power to again research antenna elements 111 that constitute the antenna subset 110A. After the flow returns to step S3, in step S4, if the subset selector 142 determines that there is no antenna element 111 for which an RSSI value of a received signal is greater than or equal to a predetermined value (S4: NO), a series of processes may be terminated (end). This is because the flow restarts from the beginning.

If the power-transmitting control unit 143 determines in step S8 not to receive index data (S8: NO), the flow returns to step S6. This is because the process in steps S6 and S7 is performed again. After the process in steps S6 and S7 is performed again, if index data is determined not to be received in step S8 (S8: NO), the series of processes may be terminated (end). This is because the flow restarts from the beginning.

If the power-transmitting control unit 143 determines in step S10 that charging of the specific device 250A is not completed (S10: NO), the flow returns to step S9. This is because the charging continues to be performed.

Figure 10:
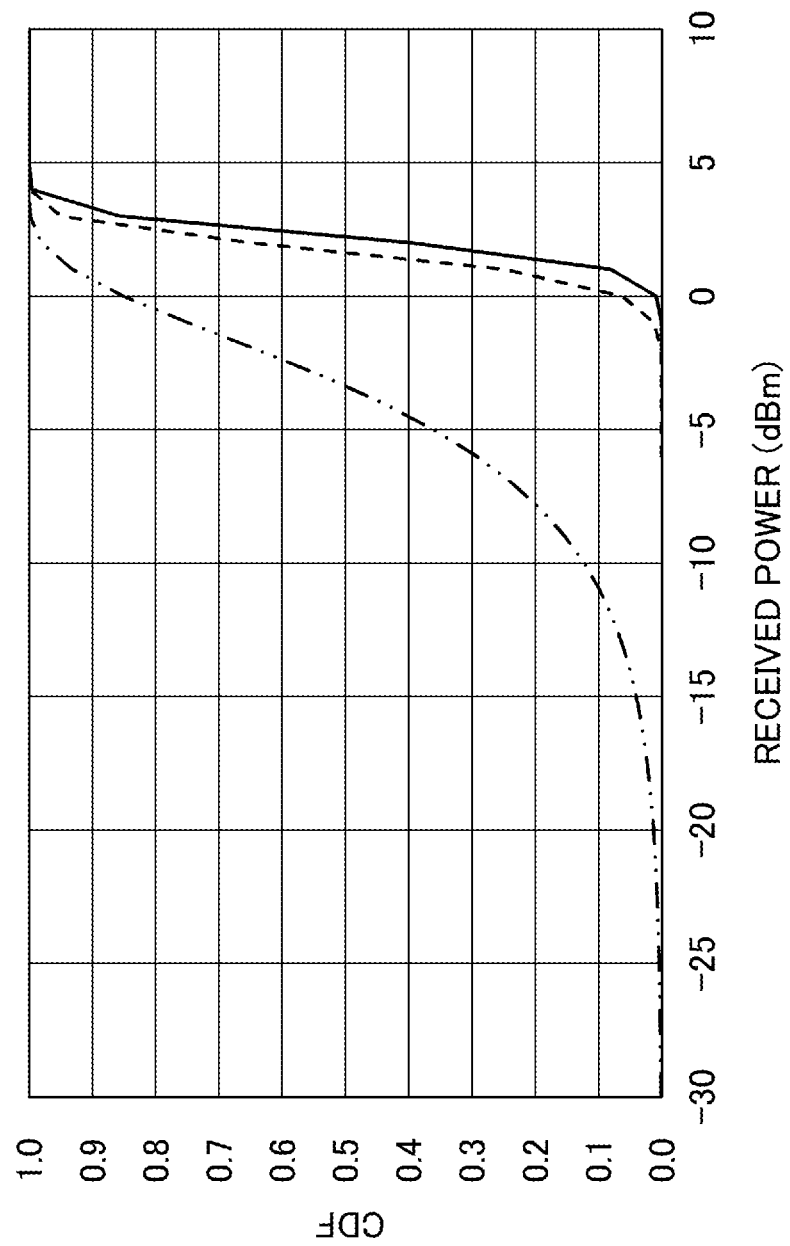
FIG. 10 is a diagram illustrating a simulation result by a cumulative distribution function of received power.

FIG. 10 is a diagram illustrating a simulation result of a cumulative distribution function (CDF) of the received power. In FIG. 10, a characteristic expressed by a broken line indicates a distribution that is provided when the specific device 250A receives the power in a subset mode, where the subset mode is set after sending back a time-slot index for which, under a condition in which the number of antenna elements 111 in the antenna subset 110A is set to 4 and, the number of time-slot indexes L in the received-power monitoring mode is set to 256, the greatest received power is obtained. In this case, the characteristic is influenced by antenna elements that operate in the random mode and around the specific device 250A, other than the antenna elements 111 in the antenna subset 110A. A characteristic expressed by a solid line indicates a distribution that is provided when the specific device 250A receives the power in the subset mode in which, under a condition in which the number of antenna elements 111 in the antenna subset 110A is set to 4, phases of the transmission signals are exactly optimized as in a conventional known technique. A characteristic expressed by a two-dot chain line indicates a distribution that is provided when the specific device 250A receives the power after the power is transmitted from all the antenna elements 111 in the random mode.

In the random mode expressed by the two-dot chain line, the received power significantly varies from −40 dBm to −5 dBm. On the other hand, in the subset mode expressed by the broken line, when the CDF is 0.5, the received power increases by about 5 dBm, and thus variations in the received power can be reduced. In the subset mode, in a predetermined region where the multiple antenna elements 111 included in the antenna subset 110A are arranged, the received power can be increased, at the expense of temporarily fixing positions where standing waves expressed by one or more transmission signals are generated, compared to positions in the random mode.

In the subset mode, the received power can be increased even when a lower time-slot index L is used. In other words, in the subset mode, the received power can be increased even when a lower time-slot index L is used. In addition, an optimum phase relation between power transmission signals, for increasing the received power in a short search time (or the number of trials) that enables a lower time-slot index L, can be detected.

Similarly, in the subset mode expressed by the solid line, the received power is slightly improved, compared to the subset mode expressed by the broken line. The optimizing of the phases of the transmission signals in the subset mode, as expressed by the solid line, is a conventional technique in which the phase of the transmission signal is optimized based on the phase of a reception signal at the antenna array in a feed device for a pilot signal that a given specific device transmits to each antenna array, as represented by a channel state information (CSI) feedback technique. In the conventional technique, each antenna array requires hardware to detect the phase of the reception signal, and thus the feed device has an increased device size. The subset mode can make the feed device compact.

The controller 140 may receive alarms from multiple devices 250. In such a case, multiple specific devices 250A exist, and multiple antenna subsets 110A are constructed by the subset selector 142.

Figure 11:
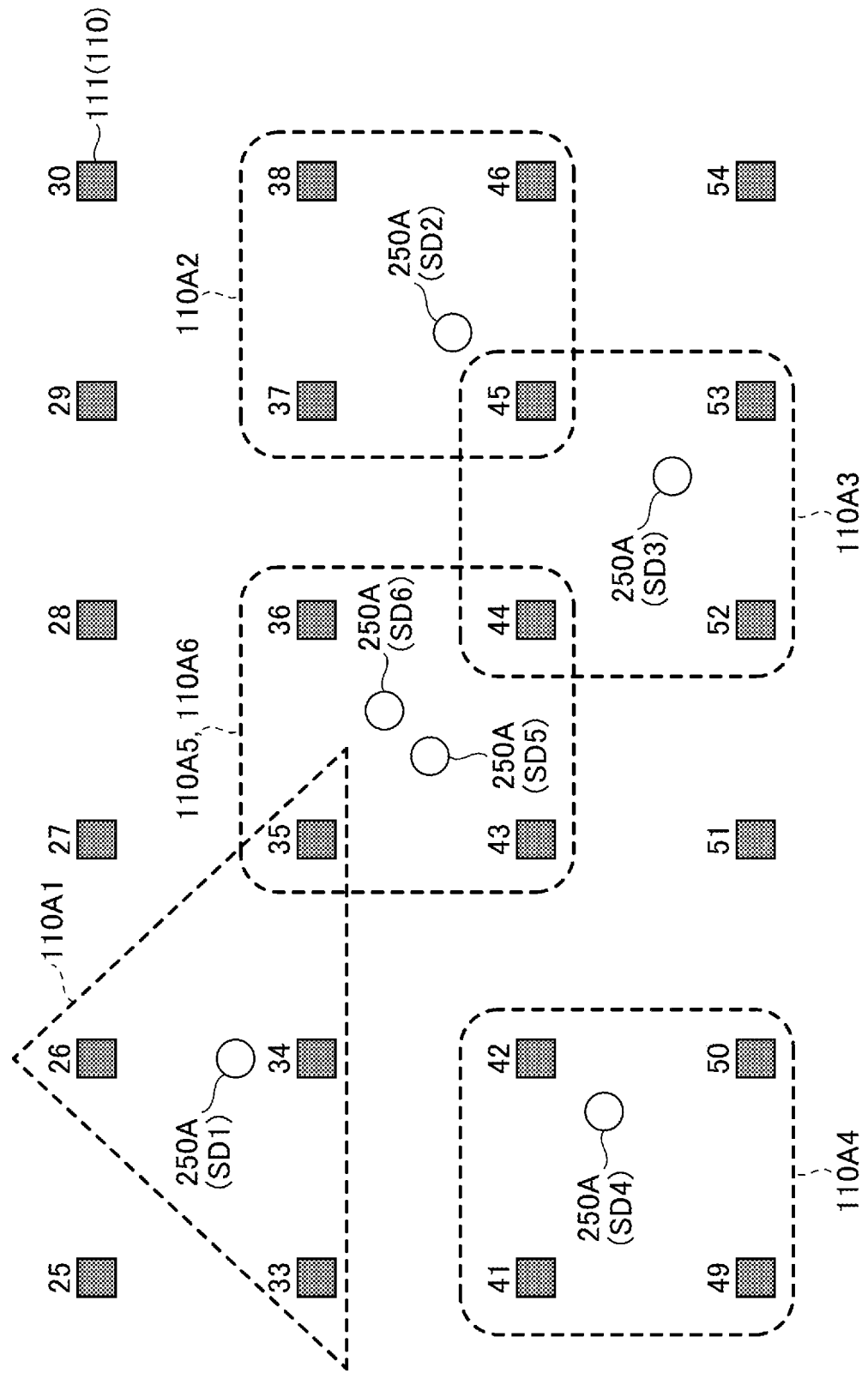
FIG. 11 is a diagram illustrating an example of multiple antenna subsets 110A1 to 110A5.

FIG. 11 is a diagram illustrating an example of multiple antenna subsets 110A1 to 110A5. The example in FIG. 11 illustrates an array antenna 110 including 24 antenna elements 111, in which four antenna elements are arranged in the vertical direction and six antenna elements are arranged in the horizontal direction. Although the 24 antenna elements 111 are illustrated in FIG. 11, the array antenna 110 may include a greater number of antenna elements 111. In addition, in FIG. 11, numbers 25 to 30, 33 to 38, 41 to 46, and 49 to 54 are each separately assigned to a corresponding antenna element among the 24 antenna elements 111. These numbers are antenna grid indexes. Each antenna grid index illustrated in FIG. 11 differs from the antenna grid indexes illustrated in FIGS. 3 to 5, 7, and 8, in notation, but is used for the same purpose.

FIG. 11 illustrates six specific devices 250A (SD1) to 250A (SD6) and six antenna subsets 110A1 to 110A6. In the following description, the specific devices 250A (SD1) to 250A (SD6) may be simply referred to as SD1 to SD6, respectively. When the antenna subsets 110A1 to 110A6 are not particularly distinguished mutually, they are simply referred to as antenna subsets 110A.

An antenna subset 110A1 is used to construct a particular device SD1, and the antenna subset 110A1 includes four antenna elements 111 numbered 26, 33, 34, and 35. An antenna subset 110A2 is used to construct a particular device SD2, and the antenna subset 110A2 includes four antenna elements 111 numbered 37, 38, 45, and 46.

An antenna subset 110A3 is used to construct a particular device SD3, and the antenna subset 110A3 includes antenna elements 111 numbered 44, 45, 52, and 53. An antenna subset 110A4 is used to construct a particular device SD4, and the antenna subset 110A4 includes four antenna elements 111 numbered 41, 42, 49, and 50.

An antenna subset 110A5 is used to construct a particular device SD5, and the antenna subset 110A5 includes four antenna elements 111 numbered 35, 36, 43, and 44. An antenna subset 110A6 is used to construct a specific device SD6, and the antenna subset 110A6 includes four antenna elements 111 numbered 35, 36, 43, and 44.

With this arrangement, the antenna element 111, number 35, included in the antenna subset 110A1 is in common with the antenna element 111, number 35, included in each of the antenna subsets 110A5 and 110A6. The antenna element 111, number 45, included in the antenna subset 110A2 is in common with the antenna element 111, number 45, included in the antenna subset 110A3. The antenna element 111, number 44, included in the antenna subset 110A3 is in common with the antenna element 111, number 44, included in each of the antenna subsets 110A5 and 110A6.

For the antenna subset 110A4 that does not include any common antenna element 111 of the other antenna subsets 110A1, 110A2, 110A3, 110A5, and 110A6, when phases of the power transmission signals transmitted from the four antenna elements 111 change sequentially, while the phase relation between the power transmission signals is maintained such that the phases of the power transmission signals match at the specific device SD4, the power can be concentratedly supplied to the specific device SD4 in the subset mode.

However, as in the antenna subsets 110A1, 110A2, 110A3, 110A5, and 110A6, when the antenna subsets 110A include at least one common antenna 111, it is difficult to actually sequentially change the phases while maintaining the phase relation between the power transmission signals in the same time-slot. In view of the situation described above, in this description, when the antenna subsets 110A include at least one common antenna 111, respective timings at which the power is supplied by the antenna subsets 110A are shifted.

Figure 12:
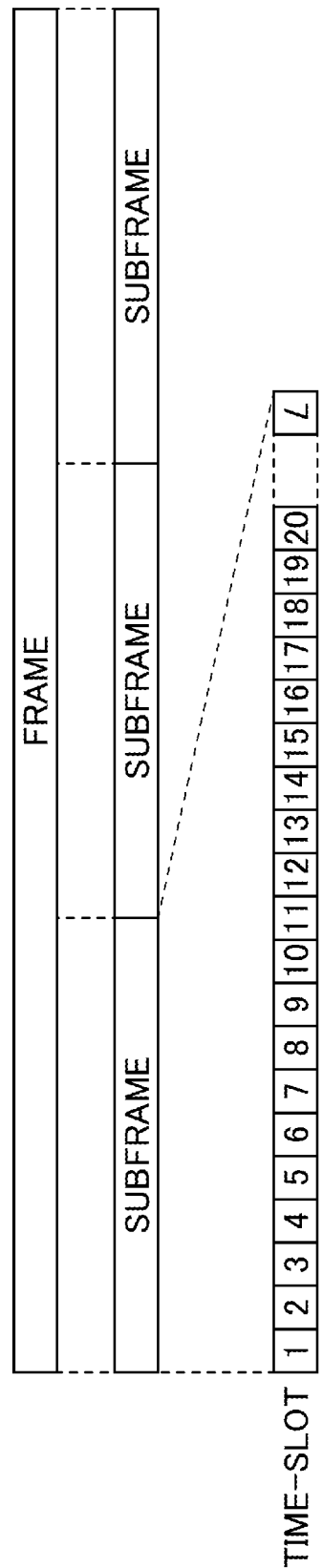
FIG. 12 is a diagram illustrating a frame structure.

FIG. 12 is a diagram illustrating a frame structure. The frame is a frame that stores a packet used when the controller 140 causes the antenna element 111 to transmit the packet used as the power transmission signal. The frame includes multiple subframes. Each subframe includes multiple time-slots 1 to L. In the present embodiment, for multiple antenna subsets 110A that include at least one common antenna element 111, power is transmitted in the subset mode from the antenna subsets 110A, by using respective different subframes. For multiple antenna subsets 110A that do not include any common antenna element 111, power is transmitted in the subset mode from the antenna subsets 110A, by using the same subframe.

That is, for the antenna subsets 110A1 to 110A6 illustrated in FIG. 11, for example, the antenna subset 110A1 and the antenna subset 110A2 do not have any common antenna element 111, and thus the power can be transmitted in the subset mode by using the same subframe. Similarly, for the antenna subset 110A1 and the antenna subset 110A3, the power can be transmitted in the subset mode by using the same subframe. Also, for the antenna subset 110A1 and the antenna subset 110A4, the power can be transmitted in the subset mode by using the same subframe.

For the antenna subset 110A2 and the antenna subset 110A4, the power can be transmitted in the subset mode by using the same subframe. For the antenna subset 110A2 and the antenna subset 110A5, the power can be transmitted in the subset mode by using the same subframe. For the antenna subset 110A2 and the antenna subset 110A6, the power can be transmitted in the subset mode by using the same subframe.

For the antenna subset 110A3 and the antenna subset 110A4, the power can be transmitted in the subset mode by using the same subframe. For the antenna subset 110A4 and the antenna subset 110A5, the power can be transmitted in the subset mode by using the same subframe. For the antenna subset 110A4 and the antenna subset 110A6, the power can be transmitted in the subset mode by using the same subframe.

In contrast, for the antenna subset 110A1 and the antenna subset 110A5, the antenna element 111, number 35, is common to these subsets, and the power is transmitted in the subset mode by different subframes. In this description, a subframe with which the power is transmitted in the subset mode from the antenna subset 110A1 to the specific device SD1 is an example of one subframe among subframes that are included in one frame. The specific device SD1 to which the power is transmitted in the subset mode by the antenna subset 110A1 is an example of one first power receiver among multiple specific devices SD1 to SD6. The four antenna elements 111 included in the antenna subset 110A1 are examples of multiple first antennas that are located around one first power receiver.

For the antenna subset 110A5 to transmit the power in the subset mode and in a different subframe from that used in the antenna subset 110A1, it is described as follows. A subframe with which the power is transmitted in the subset mode from the antenna subset 110A5 to the specific device SD5 is an example of the other subframe among the multiple subframes that are included in one frame. The specific device SD5 to which the power is transmitted in the subset mode by the antenna subset 110A5 is an example of the other first power receiver among the multiple specific devices SD1 to SD6. The four antenna elements 111 included in the antenna subset 110A5 are examples of multiple first antennas that are located around the other first power receiver.

For the antenna subset 110A1 and the antenna subset 110A6, different subframes are used to transmit the power in the subset mode. For the antenna subset 110A2 and the antenna subset 110A3, different subframes are used to transmit the power in the subset mode. For the antenna subset 110A3 and the antenna subset 110A5, different subframes are used to transmit the power in the subset mode. For the antenna subset 110A3 and the antenna subset 110A6, different subframes are used to transmit the power in the subset mode. For the antenna subset 110A5 and the antenna subset 110A6, different subframes are used to transmit the power in the subset mode.

Each of the specific devices SD1 to SD6 mainly receives the power transmission signal that is formed by random beamforming, in a case where any subframe is used except for one or more subframes with which the power is transmitted in the subset mode by the antenna subsets 110A1 to 110A6. That is, the specific devices SD1 to SD6 wait for power transmission to be performed in the subset mode and in a given subframe in a subsequent frame, because power is not transmitted in the subset mode and in any subframe other than the subframes with which the power is transmitted in the subset mode by the antenna subsets 110A1 to 110A6, and thus received power is significantly reduced.

Here, in one frame, the number of subframes can be increased, but the length of the frame is limited. With this arrangement, as the number of subframes is reduced, latency to wait for power transmission in the subset mode and with a subframe of a subsequent frame is reduced. For this reason, power can be efficiently transmitted to the specific device 250A in the subset mode.

On the other hand, if the number of specific devices 250A to receive the power that is transmitted in the subset mode and with one subframe is excessively increased, the number of antenna elements 111 that are included in the antenna subset 110A is increased, and thus the power of the transmission signal that is transmitted to a non-specific device 250B in random beamforming is reduced.

With this arrangement, preferably, the number of subframes in one frame is set to be as small as possible, in consideration of power to be received by the non-specific device 250B in the random beamforming.

When a difference between numbers for specific devices 250A that receive the power transmitted in the subset mode and with subframe is large, a difference in a received amount of power between the specific devices 250A becomes larger, where the power is received through power transmission that is performed in the subset mode and with each frame. For this reason, it is preferable to equalize the number of specific devices 250A that receive the power through power transmission that is performed in the subset mode and with each subframe.

Thus, in the present embodiment, the antenna subsets 110A1 to 110A6 are assigned to subframes as follows.

FIG. 13 is a diagram illustrating assignment order data. In this description, a way of assigning scores to the specific devices SD1 to SD6 and a way of determining an assignment order will be described as follows. A process of assigning the scores to the specific devices SD1 to SD6 and the process of determining the assignment order are performed by the power-transmitting control unit 143 (see FIG. 2).

IDs of the specific devices SD1 to SD6 in the assignment order data are 1 to 6, respectively. The leftmost column of a table for the assignment order data shows the IDs (1 to 6) of the specific devices SD1 to SD6, from top to bottom. In addition, the uppermost row shows the IDs (1 to 6) of the specific devices SD1 to SD6, from left to right.

The assignment order data indicates, for each of the specific devices SD1 to SD6, the number of antenna elements 111, which are common to one or more antenna elements 111 included in the antenna subset 110A used for the specific device 250A and one or more antenna elements 111 included in antenna subset 110A used for the other specific device 250A.

For example, for the specific device SD1, the common number of antenna elements 111 included in a corresponding antenna subset 110A1 and, antenna elements 111 that are included in the antenna subset 110A2 and are used for the other specific device SD2 is 0. Thus, the number of antenna elements 111 common to the specific device SD1 and the specific device SD2 is 0. Also, the number of antenna elements 111 common to the specific device SD1 and the specific device SD3 is 0. Similarly, the number of antenna elements 111 common to the specific device SD1 and the specific device SD4 is 0.

Further, the number of antenna elements 111 common to the specific device SD1 and the specific device SD5 is one. The number of antenna elements 111 common to the specific device SD1 and the specific device SD6 is one. This is because the common antenna element 111, number 35, is used for both of the specific devices.

The number of antenna elements 111 common to the specific device SD2 and the specific device SD3 is one. This is because the antenna element 111, number 45, is common to the antenna subsets 110A2 and 110A3. The number of antenna elements 111 common to the specific device SD2 and each of the specific devices SD4 to SD6 is zero.

The number of antenna elements 111 common to the specific device SD4 and each of the specific devices SD5 and SD6 is zero. The number of antenna elements 111 common to the specific device SD5 and the specific device SD6 is four. This is because the common antenna elements 111, numbers 35, 36, 43, and 44, are used.

In such a manner, the number of antenna elements 111 common to the specific devices SD1 to SD6 is obtained, and then a score is determined for each of the specific devices SD1 to SD6. In an example, the score is a total number of common antenna elements 111 of each one specific device 250A and the other specific device 250A. The score is an example of a commonality level indicating the extent to which one or more antenna element 111 common to multiple antenna elements 111 included in antenna subsets 110A that are used for two specific devices 250A are present. In accordance with an increasing number of common antenna elements 111, a higher score (commonality level) is obtained. The scores for the specific devices SD1 to SD6 are 2, 1, 3, 0, 6, and 6, respectively.

When the scores are determined for the specific devices SD1 to SD6, it is determined whether to transmit the power from the antenna subset 110A to the specific device 250A in the subset mode and with any one of multiple subframes in one frame. In this description, subframes are assigned to the specific devices SD1 to SD6 in descending order of score.

The order in which the subframes are assigned to the specific devices SD1 to SD6 is referred to as an assignment order. In this case, the assignment order that is determined by the score is an example of an order that is determined in accordance with the commonality level. The assignment order for the specific devices SD1 to SD6 is 4, 5, 3, 6, 1, and 2, respectively. In this description, scores for the specific devices SD5 and SD6 are both 6. For this reason, for example, the assignment order for the specific device SD5 in association with a smaller ID is set to be higher than the assignment order for the specific device SD6.

Each of FIGS. 14 to 18 is a diagram illustrating the IDs of the specific devices SD1 to SD6 that are assigned to the respective subframes. In FIGS. 14 to 18, cases where subframes to which the specific devices SD1 to SD6 are assigned are sequentially determined in accordance with the assignment order are illustrated in a stepwise manner. Such a process is performed by the power-transmitting control unit 143 (see FIG. 2).

In order to prevent the antenna subsets 110A1 to 110A6 illustrated in FIG. 11 from overlapping, at least three subframes are required. In this description, it is assumed that an ideal number of subframes is three in light of the fact that a balance is taken into consideration such that the number of subframes for the specific devices SD1 to SD6 is as small as possible, and such that the number of specific devices 250A to receive the power that is transmitted in the subset mode and in each subframe is equalized.

In each of FIGS. 14 to 18, the subframe index is illustrated on the leftmost column. The subframe index indicates the number denoting a corresponding subframe of the multiple subframes in a frame, and the subframe denoted by the subframe index, number 1, is a first subframe. The subframe indexes are numbered sequentially from the first subframe, number 1.

In addition, in FIGS. 14 to 18, four numbers in parentheses illustrated below the IDs of the specific devices SD1 to SD6 are given as an antenna grid index of the four antenna elements 111 included in each of the antenna subsets 110A1 to 110A6, which are used for a corresponding specific device among the specific devices SD1 to SD6. In an example, the antenna grid indexes for the four antenna elements 111 are indicated from left to right, in order from a given antenna element 111 having the greatest RSSI value, to a given antenna element 111 having the fourth highest RSSI value, of a corresponding power transmission command among power transmission commands that are transmitted by the specific devices SD1 to SD6.

As illustrated in FIG. 14, the specific device SD5 having the first assignment order is first assigned to a subframe assigned by the subframe index, number 1. In this description, for example, when there are multiple subframes to which the specific device 250A is not assigned, the subframes are assigned in ascending order of the subframe index number.

Next, as illustrated in FIG. 15, antenna elements 111 for the specific device SD6 having the second assignment order overlap (are in common with) those for the specific device SD5, and thus the specific device SD5 is assigned to the subframe, number 2, to avoid the first subframe. Further, in FIG. 15, for the specific device SD3 having the third assignment order, there are an antenna element 111 common to the specific devices SD5 and SD6. With this arrangement, the specific device SD3 is assigned to the subframe, number 3, to avoid the subframes, numbers 1 and 2.

Next, as illustrated in FIG. 16, for the specific device SD1 having the fourth assignment order, an antenna element 111 in common with the specific devices SD5 and SD6 is present, but any antenna element 111 in common with the specific device SD3 is not present. With this arrangement, the specific device SD1 is assigned to the subframe, number 3, to avoid the subframes, numbers 1 and 2. At this stage, from the viewpoint of equalization, it is ideal when the remaining specific devices SD2 and SD4 can be assigned to any one of the subframe, number 1, or the subframe, number 2, one by one.

Next, as illustrated in FIG. 17, for the specific device SD2 having the fifth assignment order, an antenna element 111 in common with the specific device SD3 is present, but there is no antenna element 111 in common with the specific device SD5 and the specific device SD6. With this arrangement, it is possible to assign the specific device SD2 to the subframe, number 1 or 2, to avoid the third subframe. In this description, when there are multiple subframes to be assigned, a subframe assigned, for example, by a smaller subframe index number is assigned. Thus, the specific device SD2 is assigned to the subframe, number 1.

Finally, for the specific device SD4 having the sixth assignment order, there is no antenna element 111 common to the other specific devices SD1 to SD3, SD5, and SD6. With this arrangement, the specific device SD4 can be assigned to any of the subframes, Numbers 1 to 3. In this description, as illustrated in FIG. 18, the specific device SD4 is assigned to the subframe, number 2, from the two viewpoints of reducing the number of subframes as much as possible and equalizing the number of specific device 250A to receive the power that is transmitted in the subset mode and with the subframes.

As a result, a combination of specific devices 250A is determined so as to enable both the reductions in the number of subframes as much as possible and the equalization of the number of specific devices 250A to receive the power that is transmitted in the subset mode and with the subframes.

In addition, any subframe is assigned to the specific device 250A in descending order of the assignment order. With this arrangement, each subframe can be first determined for the specific device 250A for which the greatest number of antenna elements 111 in common with the other specific device 250A is obtained. As a result, the process of assigning all the specific devices 250A to multiple subframes can be performed more easily. This is because if the subframe is assigned to a specific device 250A having a smaller number of antenna elements 111 in common with the other specific device 250A, it is difficult to ultimately find a subframe which a specific device 250A having a larger number of antenna elements 111 in common with the other specific device 250A can be assigned to.

Figure 19:
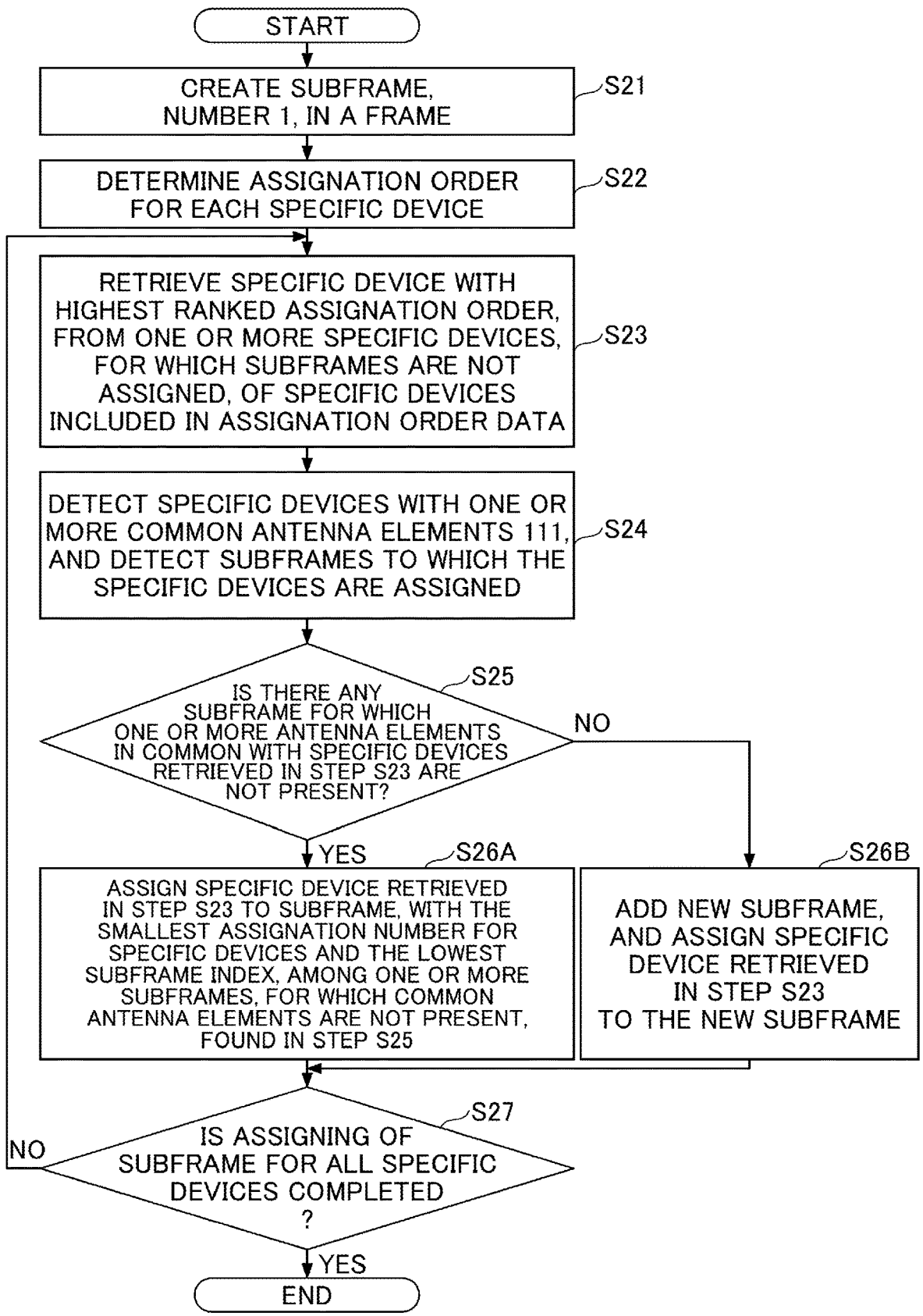
FIG. 19 is a flowchart illustrating a process executed by a power-transmitting control unit 143.

FIG. 19 is a flowchart illustrating the process executed by the power-transmitting control unit 143. As a precondition, multiple specific devices 250A exist, and multiple antenna subsets 110A are constructed by the subset selector 142.

When the process starts, the power-transmitting control unit 143 creates a subframe assigned by a subframe index, number 1, in a frame (step S21).

The power-transmitting control unit 143 determines the assignment order for each specific device 250A (step S22). The power-transmitting control unit 143 determines a score for each specific device 250A, and determines the assignment order in accordance with the score. With this arrangement, the assignment order data including the score and the assignment order as illustrated in FIG. 13 is created.

The power-transmitting control unit 143 retrieves a specific device 250A that is highest ranked in the assignment order, from specific devices 250A, that are not assigned to any subframe, of the specific devices 250A that are included in the assignment order date created in step S22 (step S23).

The power-transmitting control unit 143 compares the specific device 250A retrieved in step S23 with one or more specific device 250A that have been already assigned to the subframes in a round-robin manner, detects one or more specific devices 250A to use one or more common antenna elements 111, and detects one or more subframes to which the specific devices 250A are assigned (step S24). For the specific device 250A having the first assignment order, because there is no specific device 250A that has been already assigned to a subframe, no common antenna element 111 is detected.

The power-transmitting control unit 143 determines whether there is a subframe for which no common antenna elements 111 used for the specific device 250A retrieved in step S23 exist (step S25).

If it is determined that there is a subframe for which no common antenna element 111 exists (S25: YES), the power-transmitting control unit 143 assigns the specific device 250A retrieved in step S23 to a given subframe, for which the number of assigned specific devices 250A is the smallest value and the subframe index is the smallest value, among one or more subframes for which no common antenna element 111 exists found in step S25 (step S26A). That is, the power-transmitting control unit 143 performs the assigning of the specific device 250A retrieved in step S23, from two viewpoints of reducing the number of subframes as much as possible and equalizing the number of specific devices 250A to receive the power transmitted in the subset mode and with one or more subframes.

If it is determined that there is no subframe for which no common antenna element 111 exists (S25: NO), the power-transmitting control unit 143 adds a new subframe to the frame, and then assigns the specific device 250A retrieved in step S23 to the added subframe (step S26B).

If the process in step S26A or S26B is completed, the power-transmitting control unit 143 determines whether the assigning of the subframe for all the specific devices 250A included in the assignment order has been completed (step S27).

If the power-transmitting control unit 143 determines that the assigning of the subframe is not completed for all the specific devices 250A (S27: NO), the flow returns to step S23. As a result, the process in steps S23 to S26 is repeatedly performed for each of the remaining specific devices 250A.

If the power-transmitting control unit 143 determines in step S27 that the assigning of the subframes for all the specific devices 250A has been completed (S27: YES), a series of processes is terminated (ends).

Figure 20:
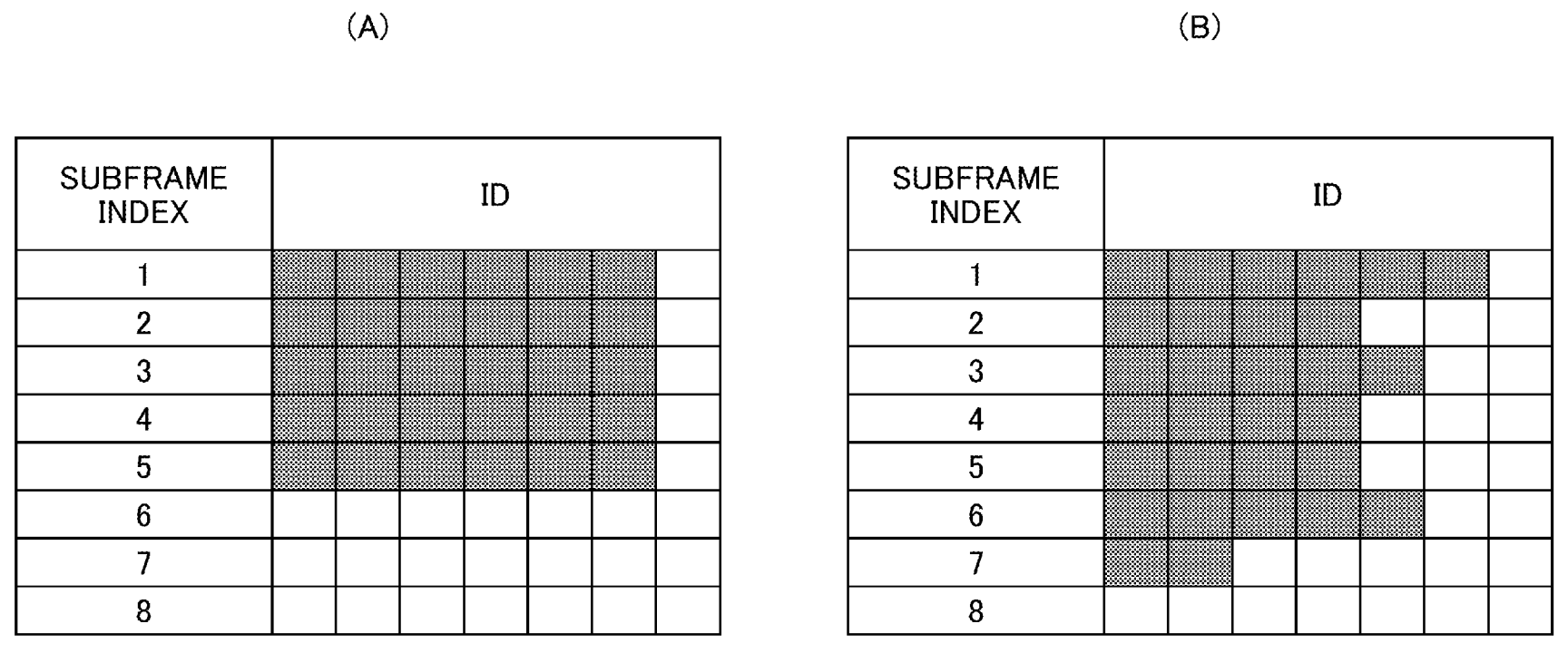

FIG. 20 is a diagram illustrating a simulation result in which each specific device 250A is assigned to a subframe.

FIG. 20(A) illustrates the result in which specific devices 250A are each assigned to a given subframe by using the assignment order data. FIG. 20(B) illustrates the result in which, without using the assignment order data, specific devices 250A are each assigned to a given subframe in ascending order of the ID number of the specific device 250A, by using the same assignment procedure as illustrated in FIG. 20(A).

In FIG. 20(A) and FIG. 20(B), for each subframe index, squares according to the number of IDs of specific devices 250A that are each assigned to a given subframe are highlighted in gray. In each of FIG. 20(A) and FIG. 20(B), the number of specific devices 250A is 30.

As illustrated in FIG. 20(A), when the assignment order data is used, six specific devices 250A are each assigned to a corresponding subframe among five subframes. The number of specific devices 250A that are assigned to all subframes is the same.

On the other hand, as illustrated in FIG. 20(B), when the assignment order is not used, the specific devices 250A are each assigned to a corresponding subframe among seven subframes, and thus a different number of specific devices 250A that are each assigned to a corresponding subframe is obtained. Six specific devices 250A are assigned to the subframe assigned by the subframe index, number 1. Five specific devices 250A are each assigned to a corresponding subframe among subframes, numbers 3 and 6. Four specific devices 250A are each assigned to a corresponding subframe among subframes, numbers 2, 4, and 5. Two specific devices 250A are each assigned to the subframe, number 7.

As can be seen from the comparison between FIG. 20(A) and FIG. 20(B), in step S26A, by assigning the specific device 250A retrieved in step S23 to a given subframe, for which the number of assigned specific devices 250A is the smallest value and the subframe index is the smallest value, among one or more subframes for which any common antenna element 111 does not exist, increases in the number of subframes can be suppressed, and the number of specific devices 250A that are each assigned to a corresponding subframe can be equalized. As illustrated in FIG. 20(A), in the approach according to the embodiment, by assigning an equal number of specific devices 250A to each subframe, equalized spatial multiplexing can be realized. In other words, in the approach according to the embodiment, space-time scheduling capable of realizing frame time-efficient power transmission to a plurality of specific devices 250A in the subset mode.

FIG. 21 is a diagram illustrating an example of drive data. The drive data is data used when the power-transmitting control unit 143 drives the array antenna 110 for each frame. The drive data includes IDs, and antenna grid indexes, for the specific devices SD1 to SD6 that are each assigned to a corresponding subframe, and includes antenna grid indexes for the antenna elements 111 from which power transmission signals are transmitted by random beamforming. In addition, the drive data includes a subframe having the subframe index, number 0. The drive data illustrated in FIG. 21 is data that is obtained by adding the subframe, number 0, and antenna grid indexes of the antenna element 111 via which the power is transmitted by random beamforming, in the subframes, numbers 1 to 3, to the data illustrated in FIG. 18.

In an example, antenna grid indexes of all the antenna elements 111 that are included in the array antenna 110 are registered in the subframe, number 0. With use of the subframe, number 0, power transmission signals are transmitted from all antenna elements 111 by random beamforming. Further, in the subframe, number 0, the process in steps S1 to S8 illustrated in FIG. 9 is performed. With this approach, in the subframe, number 0, the specific device 250A is identified by the process in step S8, and the process in steps S21 to S27 illustrated in FIG. 19 are performed.

For each of subframes, numbers 1 to 3, power transmission signals, which are for transmitting the power in the subset mode, are transmitted in the subset mode from antenna elements 111 included in a given antenna subset 110A that is used for the specific device 250A. Also, power transmission signals that are formed in random beamforming are transmitted by the other antenna elements 111. For each of subframes, number 1 to 3, the process in steps S9 to S11 illustrated in FIG. 9 is performed using antenna elements 111 that are included in the antenna subset 110A. The other antenna elements 111 are used to perform the same process as the process for the subframe, number 0.

In the drive data illustrated in FIG. 21, antenna grid indexes 35, 43, 36, 44, 45, 37, 46, and 38 of antenna elements 111 that are included in the antenna subsets 110A5 and 110A2 corresponding to the specific devices SD5 and SD2 are registered in the subframe, number 1. With this arrangement, the antenna grid indexes of the other antenna elements 111 are numbers obtained by removing the antenna grid indexes 35, 43, 36, 44, 45, 37, 46, and 38 from the antenna grid indexes of all the antenna elements 111 included in the array antenna 110.

In the subframe, number 1, power transmission signals are transmitted by random beamforming from the antenna elements 111 included in each of the antenna subsets 110A6, 110A4, 110A3, and 110A1 that are used for a corresponding specific device among the specific devices SD6, SD4, SD3, and SD1.

Also, in the subframe, number 2, antenna grid indexes 36, 35, 44, 43, 42, 50, 41, and 49 of antenna elements 111 that are included in the antenna subsets 110A6 and 110A4, which are used for the specific devices SD6 and SD4, are registered. With this arrangement, the antenna grid indexes of the other antenna elements 111 are assigned by numbers that are obtained by removing the antenna grid indexes 36, 35, 44, 43, 42, 50, 41, and 49 from the antenna grid indexes of all the antenna elements 111 included in the array antenna 110.

In subframe, number 2, power transmission signals are transmitted by random beamforming from the antenna elements 111 included in the antenna subsets 110A5, 110A2, 110A3, and 110A1 that are used for the specific devices SD5, SD2, SD3, and SD1.

In addition, antenna grid indexes 53, 45, 52, 44, 34, 26, 35, and 33 of the antenna elements 111 included in the antenna subsets 110A3 and 110A1 that are used for the specific devices SD3 and SD1 are registered in the subframe, number 3. With this arrangement, the antenna grid indexes of the other antenna elements 111 are assigned by numbers that are obtained by removing the antenna grid indexes 53, 45, 52, 44, 34, 26, 35, and 33 from the antenna grid indexes of all the antenna elements 111 included in the array antenna 110.

In the subframe, number 3, power transmission signals are transmitted for random beamforming from the antenna elements 111 included in the antenna subsets 110A5, 110A2, 110A6, and 110A4 that are used for the specific devices SD5, SD2, SD6, and SD4.

As described above, in the feed device 100, the power from the antenna elements 111 included in the antenna subset 110A is transmitted to the specific device 250A in the subset mode, and the power from one or more antenna elements 111 that are not included in the antenna subset 110A is transmitted to a non-specific device 250B in the random mode. In the subset mode, a set of phases of the power transmission signals from multiple antenna elements 111 that are included in the antenna subset 110A is randomly shifted for each time-slot, while maintaining the phase relation between the power transmission signals in a case where the greatest received power is obtained at the specific device 250A. In the random mode, phases of the power transmission signals to be transmitted to the non-specific devices 250B are randomly shifted for each antenna element 111 and for each time-slot.

In addition, each frame is divided into a plurality of subframes. For antenna subsets 110A including one or more common antenna elements 111, phases are sequentially shifted, while maintaining the phase relation between the power transmission signals so as to match the phases of the power transmission signals that are received by the specific device 250A, in order to transmit the power in the subset mode and in mutually different subframes.

With this arrangement, the feed device 100 and the feed method capable of both powering multiple specific devices 250A that requires a large amount of received power and powering a non-specific device 250B can be provided. Also, in the subset mode, phases of the power transmission signals from the multiple antenna elements 111 that are included in the antenna subset 110A are randomly shifted for each time-slot, while maintaining the phase relation between the power transmission signals from the multiple antenna elements 111. With this arrangement, without reducing a random effect on the power transmission by the random mode in which one or more antenna elements 111 other than the antenna subset 110A are used, both the subset mode used within the antenna subset 110A and the random mode used outside the antenna subset 110A can be effectively activated.

In addition, for one or more antenna elements 111 included in the antenna subset 110A, power is transmitted in the random mode and in any subframe other than subframes used in the subset mode. In this case, the power can be efficiently transmitted in the random mode to a device 250 that is near the specific device 250A and for which any antenna subset 110A is not constructed.

In addition, power transmission in the random mode is performed in accordance with a subframe with which powering in the subset mode is performed. With this arrangement, when a charged amount of the battery 253 in the device 250 for which the antenna subset 110A is not constructed becomes less than or equal to a predetermined value, transition to the specific device 250A can be smoothly performed.

In addition, specific devices 250A are assigned to the subframes in accordance with the assignment order. With this arrangement, the process of assigning all the specific devices 250A to multiple subframes can be easily performed. In particular, the specific devices 250A are assigned to subframes in descending order of assignment order. With this arrangement, the process of assigning all the specific devices 250A to the multiple subframes can be performed more easily.

In addition, the specific device 250A is assigned to the subframe, for which the assignment number for the specific device 250A is the smallest value and the subframe index is the smallest number, among one or more subframes for which one or more common antenna elements 111 are not present. With this arrangement, the number of subframes is reduced as much as possible, while equalizing the number of specific devices 250A that receive the power transmitted in the subset mode and with any subframes.

In addition, when there is no subframe for which any common antenna element 111 does not exist, a new subframe is added to a given frame, and then the specific device 250A is assigned to the added subframe. With this arrangement, for each specific device 250A, powering can be performed in the subset mode and with a subframe for which any antenna element 111 in common with the other specific device 250A does not exist.

When the power is transmitted from the antenna elements 111 included in the antenna subset 110A, to the specific device 250A, digital phase modulation such as quadrature phase shift keying (QPSK) may be performed on the power transmission signal, and then information may be communicated from the antenna elements 111 to the specific device 250A via the power transmission signal. For example, information may be communicated from the antenna elements 111 to the specific device 250A, by setting a change amount of the phase of the power transmission signal to $\pm\pi/2$ or $\pm\pi$ and thereby differentially encoding the power transmission signal.

In the above description, the manner in which index data indicating a time-slot index in a case where the greatest received power at the specific device 250A is obtained is transmitted to the controller 140 is illustrated. One-type phase relation is used.

However, the specific device 250A detects multiple time-slot indexes for which the received power is greater than or equal to a predetermined value, and may transmit the power while changing the phase relation between power transmission signals for the multiple time-slot indexes. For example, when the received power of the specific device 250A becomes greater than or equal to the predetermined value, in both cases where phase indexes of the power that is transmitted from the antenna elements 111 with antenna grid indexes of (4, 4), (4, 5), (5, 4), and (5, 5) are 29, 11, 3, and 24, and where the phase indexes of the transmission signals are 32, 46, 15, and 59, the power may be transmitted, while sequentially changing and maintaining the phase relation that is provided by a phase differences between given phase indexes among the phase indexes of 29, 11, 3, and 24, including the phase relation that is provided by phase differences between given phase indexes among the phase indexes of 32, 46, 15, and 59.

In this case, when the phase indexes of the power transmission signal are 29, 11, 3, and 24, this is an example of a first timing. The phase relation in which the phase indexes of the power transmission signal have phase differences that are defined by 29, 11, 3, and 24 is an example of a first phase relation. When the phase indexes of the power transmission signal are 32, 46, 15, and 59, this is an example of a second timing. The phase relation in which the phase indexes of the power transmission signal have phase differences that are defined by 32, 46, 15, and 59 is an example of a second phase relation.

Although the feed device and the feed method according to the exemplary embodiments of the present invention are described above, the present invention is not limited to the specifically disclosed embodiments, and various modifications and changes can be made without departing from the scope of the claims.

This international application claims priority to the Japanese Patent Application No. 2021-084702, filed May 19, 2021, the entire contents of which are incorporated herein by reference.

DESCRIPTION OF SYMBOLS 10 region
100 feed device 110 array antenna
110A, 110A1 to 110A6 antenna subset
111 antenna element
120 phase shifter
130 microwave generator
140 controller
141 main control unit
142 subset selector
143 power-transmitting control unit
144 memory
250 device
250A specific device
250B non-specific device

The invention claimed is:

1. A feed device comprising:
a power-transmitting control circuit configured to
control phases of power transmission signals from multiple first antennas, which are located around each of multiple first power receivers, among multiple antennas from which power is configured to be transmitted, and
control phases of power transmission signals from one or more second antennas, other than the multiple first antennas located around each of the multiple first power receivers, among the multiple antennas,
wherein the multiple first antennas located around one first power receiver among the multiple first power receivers, and multiple first antennas located around another first power receiver among the multiple first power receivers share at least one first antenna, and
wherein the power-transmitting control circuit is configured to
repeat a frame including multiple subframes to control the phases of the power transmission signals from the multiple first antennas located around each of the multiple first power receivers, such that,
for one subframe of the multiple subframes, the phases of the power transmission signals from the multiple first antennas sequentially change while maintaining a first phase relation between the power transmission signals from the multiple first antennas, so as to match the phases of the power transmission signals that the one first power receiver, among the multiple first power receivers, receives from the multiple first antennas, which are located around the one first power receiver among the multiple first power receivers, and
for another subframe of the multiple subframes, the phases of the power transmission signals from the multiple first antennas sequentially change while maintaining a second phase relation between the power transmission signals from the multiple first antennas, so as to match the phases of the power transmission signals that the another first power receiver, among the multiple first power receivers, receives from the multiple first antennas located around the another first power receiver among the multiple first power receivers, and
sequentially change the phases of the power transmission signals that are transmitted from the one or more second antennas.

2. The feed device according to claim 1, wherein for a subframe other than the one subframe, the power-transmitting control circuit is configured to sequentially change the phases of the power transmission signals transmitted by the multiple first antennas that are located around the one first power receiver.

3. The feed device according to claim 1, wherein for a subframe other than the another subframe, the power-transmitting control circuit is configured to sequentially change the phases of the power transmission signals transmitted by the multiple first antennas that are located around the another first power receiver.

4. The feed device according to claim 1, wherein the power-transmitting control circuit is configured to sequentially change the phases of the power transmission signals transmitted by the one or more second antennas, in accordance with the multiple subframes.

5. The feed device according to claim 1, wherein for a given first power receiver around which multiple first antennas, which do not include any first antenna in common with the multiple first antennas located around the one first power receiver among the multiple first power receivers, are located,
the power-transmitting control circuit is configured, for the one subframe, to sequentially change phases of power transmission signals that the given first power receiver receives from multiple first antennas located around the given first power receiver, while maintaining a third phase relation between the power transmission signals, so as to match the phases of the power transmission signals.

6. The feed device according to claim 5, wherein the power-transmitting control circuit is configured to sequentially change, for a subframe other than the one subframe, the phases of the power transmission signals transmitted by the multiple first antennas that do not include any first antenna in common with the multiple first antennas located around the one first power receiver.

7. The feed device according to claim 1, wherein, for a given first power receiver around which multiple first antennas, which do not include any first antenna in common with the multiple first antennas located around the another first power receiver among the multiple first power receivers, are located,
the power-transmitting control circuit is configured, for the another subframe, to sequentially change phases of power transmission signals that the given first power receiver receives from the multiple first antennas located around the given first power receiver, while maintaining a third phase relation between the power transmission signals, so as to match the phases of the power transmission signals.

8. The feed device according to claim 7, wherein the power-transmitting control circuit is configured to sequentially change, for a subframe other than the another subframe, the phases of the power transmission signals transmitted by the multiple first antennas that do not include any first antenna in common with the multiple first antennas located around the another first power receiver.

9. The feed device according to claim 1, wherein for each of the multiple first power receivers,
the power-transmitting control circuit is configured to
determine a commonality level indicating an extent to which multiple first antennas located around the first power receivers share one or more first antennas, and
determine to which of the multiple subframes the first power receiver is assigned in order according to the commonality level for the first power receiver.

10. The feed device according to claim 9, wherein the power-transmitting control circuit is configured to determine one or more subframes to be assigned in order from a first power receiver having a highest commonality level.

11. The feed device according to claim 1, wherein the power-transmitting control circuit is configured to assign, to a same subframe, given first power receivers, for which multiple first antennas located around the given first power do not include any common first antenna, among the multiple first power receivers.

12. The feed device according to claim 1, wherein for a given first power receiver, for which first antennas in common with multiple first antennas located around one or more first power receivers that are assigned to one or more subframes are present,
the power-transmitting control circuit is configured to add a new subframe to the frame to assign the given first power receiver to the new subframe.

13. The feed device according to claim 1, wherein for a given first power receiver, for which there is no first antenna in common with the multiple first antennas located around the multiple first power receivers that have been assigned to the multiple subframes, and
wherein the power-transmitting control circuit is configured to assign the given first power receiver to a subframe, for which the number of first power receivers that have been assigned is smaller than the number of first power receivers assigned to the another subframe, among the multiple subframes.

14. The feed device according to claim 1, wherein the power-transmitting control circuit is configured to determine, for the multiple first power receivers, a combination of first power receivers to be assigned to each subframe, such that the number of subframes is reduced.

15. The feed device according to claim 1, wherein the power-transmitting control circuit is configured to determine, for the multiple first power receivers, a combination of first power receivers to be assigned to each subframe, such that the number of first power receivers to be assigned to each subframe is equalized.

16. The feed device according to claim 1, wherein each of the first phase relation and the second phase relation is a relation between the phases of the power transmission signals from the multiple first antennas, the relation being provided in a case where received power at a given first power receiver becomes greater than or equal to a predetermined threshold under a condition in which the power-transmitting control circuit randomly sequentially changes the phases of the power transmission signals from the multiple first antennas.

17. The feed device according to claim 16, wherein in a case where the power-transmitting control circuit is configured to randomly sequentially changes the phases of the power transmission signals from the multiple first antennas,
the first phase relation and the second phase relation include
a third phase relation that is provided at a first timing at which received power at a given first power receiver becomes greater than or equal to a predetermined threshold, and
a fourth phase relation that is provided at a second timing at which the received power at the given first power receiver becomes greater than or equal to the predetermined threshold, and
wherein the power-transmitting control circuit is configured to sequentially switch the phases of the power transmission signals from the multiple first antennas, between the third phase relation and the fourth phase relation.

18. The feed device according to claim 1, wherein for each one time-slot or each set of time-slots, the power-transmitting control circuit is configured to sequentially change the phases of the power transmission signals from the multiple first antennas, while maintaining a third phase relation between the power transmission signals from the multiple first antennas, such that,
a given first power receiver communicates, to the power-transmitting control circuit, information identifying a given time-slot that is used in a case where received power becomes greater than or equal to a predetermined threshold, and
wherein the power-transmitting control circuit is configured to set, as the first phase relation and the second phase relation, the phases of the power transmission signals from the multiple first antennas, at the given time-slot identified by the communicated information.

19. The feed device according to claim 1, wherein the multiple first antennas include multiple antennas, for which received power obtained in a case where a given first power receiver transmits a signal is greater than or equal to a predetermined value, among the multiple antennas.

20. The feed device according to claim 1, wherein in a case of sequentially changing the phases of the power transmission signals from the multiple first antennas, while maintaining the first phase relation and the second phase relation of the power transmission signals from the multiple first antennas,
the power-transmitting control circuit is configured to
set a change amount of the phase of each of the power transmission signals from the multiple first antennas to ±π/2 or ±π, to differentially encode the power transmission signal, and
communicate information to the first power receiver.

21. A feed method comprising:
controlling phases of power transmission signals from multiple first antennas, which are located around each of multiple first power receivers, among multiple antennas from which power is configured to be transmitted, and
controlling phases of power transmission signals from one or more second antennas, other than the multiple first antennas located around each of the multiple first power receivers, among the multiple antennas,
wherein the multiple first antennas located around one first power receiver among the multiple first power receivers, and multiple first antennas located around another first power receiver among the multiple first power receivers share at least one first antenna, and
wherein the feed method includes
repeating a frame including multiple subframes to control the phases of the power transmission signals from the multiple first antennas located around each of the multiple first power receivers, such that,
for one subframe of the multiple subframes, the phases of the power transmission signals from the multiple first antennas sequentially change while maintaining a first phase relation between the power transmission signals from the multiple first antennas, so as to match the phases of the power transmission signals that one of the multiple first power receivers receives from the multiple first antennas, which are located around the one first power receiver of the multiple first power receivers, and
for another subframe of the multiple subframes, the phases of the power transmission signals from the multiple first antennas sequentially change while maintaining a second phase relation between the power transmission signals from the multiple first antennas, so as to match the phases of the power transmission signals that the another first power receiver, among the multiple first power receivers, receives from the multiple first antennas located around the another first power receiver, among the multiple first power receivers, and sequentially changing the phases of power transmission signals that are transmitted from the one or more second antennas.

* * * * *